US012132395B2

(12) United States Patent
Kondou et al.

(10) Patent No.: US 12,132,395 B2
(45) Date of Patent: Oct. 29, 2024

(54) ROTATING ELECTRICAL MACHINE CONTROL DEVICE

(71) Applicant: DENSO CORPORATION, Kariya (JP)

(72) Inventors: Kousuke Kondou, Kariya (JP); Yasuaki Aoki, Kariya (JP)

(73) Assignee: DENSO CORPORATION, Kariya (JP)

( * ) Notice: Subject to any disclaimer, the term of this patent is extended or adjusted under 35 U.S.C. 154(b) by 313 days.

(21) Appl. No.: 17/685,456

(22) Filed: Mar. 3, 2022

(65) Prior Publication Data

US 2022/0190710 A1 Jun. 16, 2022

Related U.S. Application Data

(63) Continuation of application No. PCT/JP2020/032960, filed on Aug. 31, 2020.

(30) Foreign Application Priority Data

Sep. 3, 2019 (JP) .................. 2019-160718

(51) Int. Cl.
*H02P 6/15* (2016.01)
*H02M 1/14* (2006.01)
*H02M 3/07* (2006.01)
*H02M 3/158* (2006.01)
*H02P 11/04* (2006.01)
*H02P 21/04* (2006.01)

(52) U.S. Cl.
CPC ............. *H02M 1/143* (2013.01); *H02M 3/07* (2013.01); *H02M 3/158* (2013.01); *H02P 11/04* (2013.01)

(58) Field of Classification Search
CPC ....................................................... H02P 9/30
See application file for complete search history.

(56) References Cited

U.S. PATENT DOCUMENTS

2017/0274926 A1* 9/2017 Furukawa .............. B62D 5/046
2018/0331645 A1 11/2018 Aoki et al.

FOREIGN PATENT DOCUMENTS

JP 2004-312822 A 11/2004
JP 2016-005368 A 1/2016

OTHER PUBLICATIONS

Nov. 2, 2020 Search Report issued in International Patent Application No. PCT/JP2020/032960.

* cited by examiner

*Primary Examiner* — Kawing Chan
*Assistant Examiner* — Charles S Laughlin
(74) *Attorney, Agent, or Firm* — Oliff PLC

(57) ABSTRACT

A rotating electrical machine control device is applied to a system including a power conversion circuit electrically connected to a rotating electrical machine, and a capacitor electrically connected to an input side of the power conversion circuit. The rotating electrical machine control device includes a determination unit that determines a switching mode of the power conversion circuit in which a ripple current flowing through the capacitor is reflected, based on an operating area of the rotating electrical machine, and an operation unit that operates the power conversion circuit such that the switching mode of the power conversion circuit is the switching mode determined by the determination unit.

23 Claims, 22 Drawing Sheets

| VOLTAGE VECTOR | SWITCHES TURNED ON | | | Iinv |
|---|---|---|---|---|
| V0 | SUL | SVL | SWL | 0 |
| V1 | SUH | SVL | SWL | IU |
| V2 | SUH | SVH | SWL | -IW |
| V3 | SUL | SVH | SWL | IV |
| V4 | SUL | SVH | SWH | -IU |
| V5 | SUL | SVL | SWH | IW |
| V6 | SUH | SVL | SWH | -IV |
| V7 | SUH | SVH | SWH | 0 |

FIG.6
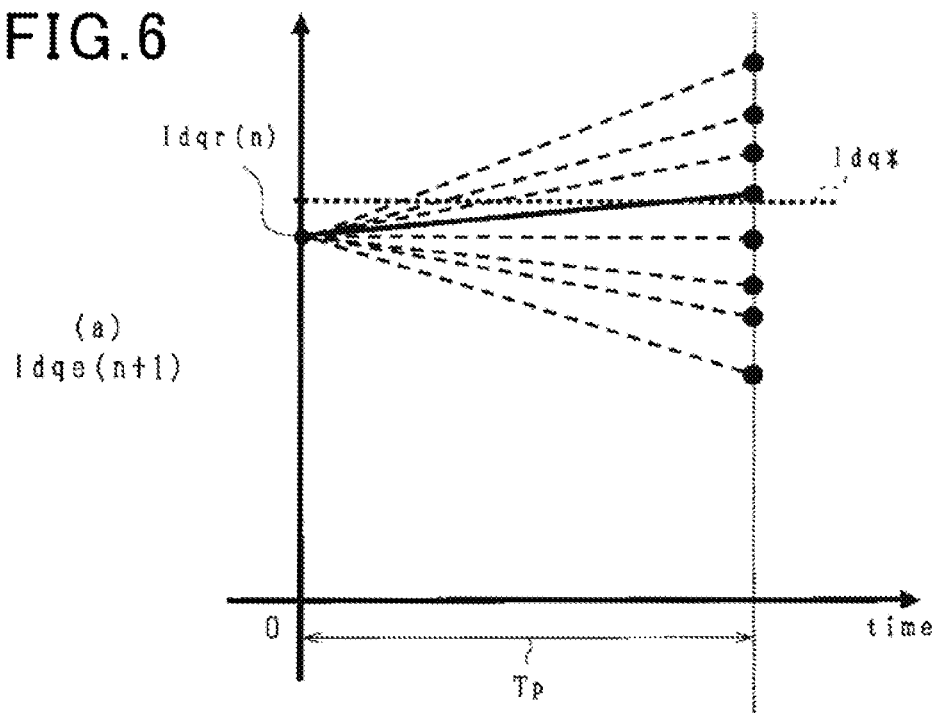
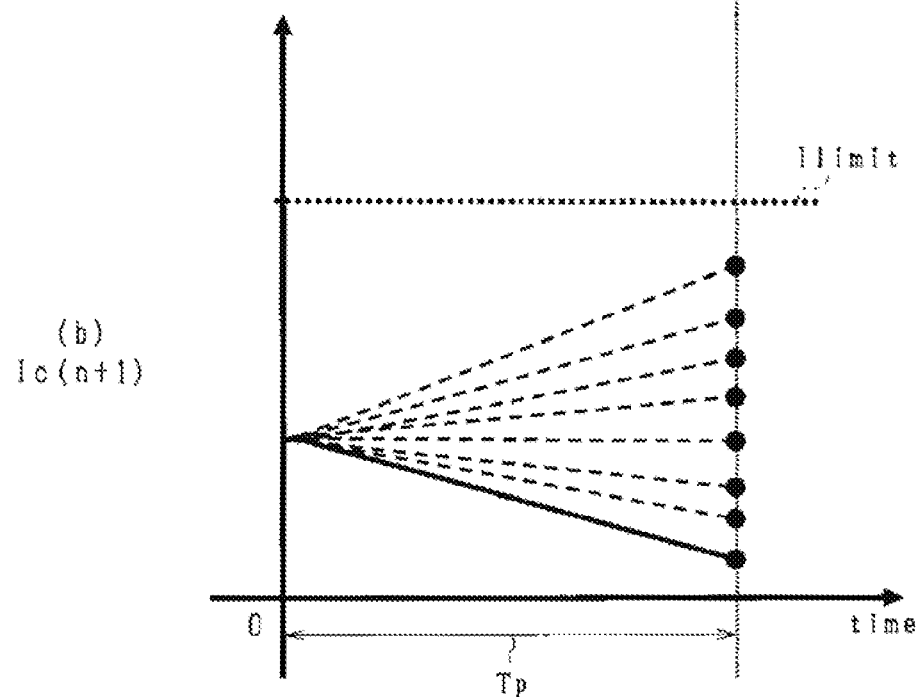

FIG.18

| VECTOR / SECTION | V0 | V1 | V2 | V3 | V4 | V5 | V6 | V7 |
|---|---|---|---|---|---|---|---|---|
| A | — | — | ○ | — | — | — | ○ | ○ |
| B | ○ | ○ | — | ○ | — | — | — | — |
| C | — | — | ○ | — | ○ | — | — | ○ |
| D | ○ | — | — | ○ | — | ○ | — | — |
| E | — | — | — | — | ○ | — | ○ | ○ |
| F | ○ | ○ | — | — | — | ○ | — | — |

FIG.19

| VECTOR / SECTION | V0 | V1 | V2 | V3 | V4 | V5 | V6 | V7 |
|---|---|---|---|---|---|---|---|---|
| A | ○ | — | ○ | — | — | — | ○ | ○ |
| B | ○ | ○ | — | ○ | — | — | — | ○ |
| C | ○ | — | ○ | — | ○ | — | — | ○ |
| D | ○ | — | — | ○ | — | ○ | — | ○ |
| E | ○ | — | — | — | ○ | — | ○ | ○ |
| F | ○ | ○ | — | — | — | ○ | — | ○ |

FIG.21

| VECTOR / SECTION | V0 | V1 | V2 | V3 | V4 | V5 | V6 | V7 |
|---|---|---|---|---|---|---|---|---|
| 1-A | — | ○ | ○ | — | — | — | ○ | — |
| 1-B | — | ○ | ○ | ○ | — | — | — | — |
| 2-B | — | ○ | ○ | ○ | — | — | — | — |
| 2-C | — | — | ○ | ○ | ○ | — | — | — |
| 3-C | — | — | ○ | ○ | ○ | — | — | — |
| 3-D | — | — | — | ○ | ○ | ○ | — | — |
| 4-D | — | — | — | ○ | ○ | ○ | — | — |
| 4-E | — | — | — | — | ○ | ○ | ○ | — |
| 5-E | — | — | — | — | ○ | ○ | ○ | — |
| 5-F | — | ○ | — | — | — | ○ | ○ | — |
| 6-F | — | ○ | — | — | — | ○ | ○ | — |
| 6-A | — | — | — | — | — | — | — | — |

ROTATING ELECTRICAL MACHINE CONTROL DEVICE

CROSS-REFERENCE TO RELATED APPLICATION

The present application is based on and claims the benefit of priority from earlier Japanese Patent Application No. 2019-160718 filed on Sep. 3, 2019, the description of which is incorporated herein by reference.

BACKGROUND

Technical Field

The present disclosure relates to a rotating electrical machine control device that is applied to a system including a power conversion circuit electrically connected to a rotating electrical machine and a capacitor electrically connected to an input side of the power conversion device.

Related Art

For reducing the capacitor in this type of system, there is a need to reduce a ripple current flowing through the capacitor.

SUMMARY

An aspect of the present disclosure provides a rotating electrical machine control device applied to a system including:

a power conversion circuit electrically connected to a rotating electrical machine; and a capacitor electrically connected to an input side of the power conversion circuit, the rotating electrical machine control device including:

a determination unit that determines a switching mode of the power conversion circuit in which a ripple current flowing through the capacitor is reflected, based on an operating area of the rotating electrical machine; and an operation unit that operates the power conversion circuit such that the switching mode of the power conversion circuit is the switching mode determined by the determination unit.

BRIEF DESCRIPTION OF THE DRAWINGS

In the accompanying drawings:

FIG. 6 is a diagram showing an example of a result of predicting currents at the timing after a lapse of one prediction cycle;

FIG. 18 is a diagram showing 120-degree voltage vectors corresponding to the section A to F and one reactive voltage vector;

FIG. 19 is a diagram showing 120-degree voltage vectors corresponding to sections A to F according to a modification example of the fourth embodiment and two reactive voltage vectors;

FIG. 21 is a diagram showing three active voltage vectors corresponding to the sections 1-A to 6-A;

DETAILED DESCRIPTION OF THE PREFERRED EMBODIMENTS

For reducing the capacitor in this type of system, there is a need to reduce a ripple current flowing through the capacitor. For reducing the ripple current, JP 2004-312822 A discloses herein a control device that performs control for reducing reactive voltage vectors applied to the rotating electrical machine. Specifically, this control device performs two-phase modulation control, based on two active voltage vectors that sandwich a command voltage vector applied to the rotating electrical machine and have a phase difference of 120 degrees from each other. Thus, the period of charging the capacitor can be reduced, thereby attempting to reduce the ripple current flowing through the capacitor.

A switching mode that has a profound effect on the reduction of the ripple current flowing through the capacitor can vary depending on the operating area of the rotating electrical machine. For this reason, techniques that provide the effect of reducing the ripple current flowing through the capacitor, regardless of the operating area, are believed to have room for improvement.

An object of the present disclosure is to provide a rotating electrical machine control device that is capable of reducing a ripple current flowing through a capacitor, regardless of the operating area of the rotating electrical machine.

First Embodiment

A first embodiment as an embodiment of a control device according to the present disclosure will be described below with reference to the drawings.

Figure 1:
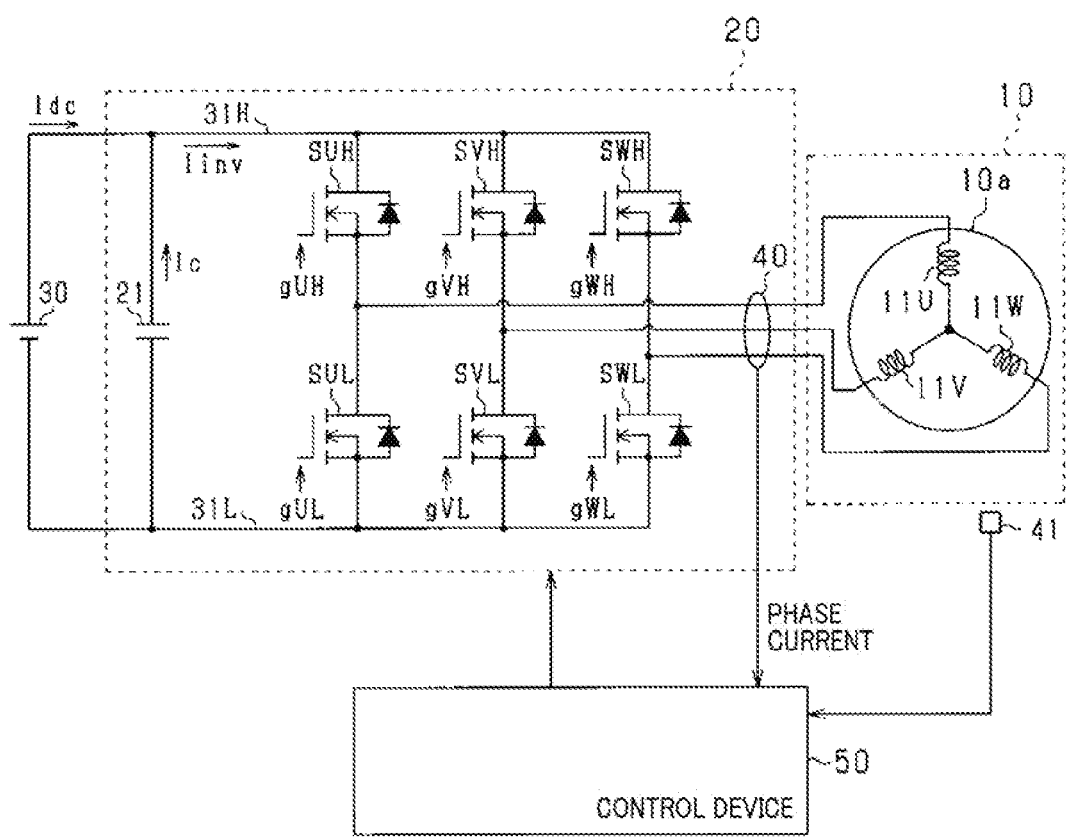
FIG. 1 is an overall configuration diagram of a rotating electrical machine control system according to a first embodiment.

As shown in FIG. 1, a control system includes a rotating electrical machine 10 and an inverter 20. The rotating electrical machine 10 is a brushless synchronous machine, which is a permanent magnet synchronous machine according to the present embodiment. The rotating electrical machine 10 includes a rotor 10a and U, V, and W phase windings 11U, 11V, and 11W as stator windings.

The rotating electrical machine 10 is connected via the inverter 20 to a battery 30 as a direct-current power supply. The inverter 20 includes a series-connected unit of upper arm switches SUH, SVH, and SWH and lower arm switches SUL, SVL, and SWL. On the U phase, a first end of the U phase winding 11U of the rotating electrical machine 10 is connected to the connection point between the lower arm switches SUH and SUL. On the V phase, a first end of the V phase winding 11V of the rotating electrical machine 10 is connected to the connection point between the lower arm switches SVH and SVL. On the W phase, a first end of the W phase winding 11W of the rotating electrical machine 10 is connected to the connection point between the lower arm switches SWH and SWL. The U, V, and W phase windings 11U, 11V, and 11W have second ends connected at the neutral point. According to the present embodiment, the U, V, and W phase windings 11U, 11V, and 11W as inductive loads are shifted by 120° in electrical angle from each other.

According to the present embodiment, as each of the switches SUH, SUL, SVH, SVL, SWH, and SWL, a voltage control-type semiconductor switching element is used, more specifically, an N-channel MOSFET is used. Each of the switches SUH, SUL, SVH, SVL, SWH, and SWL has a built-in body diode.

The inverter 20 includes, on the input side thereof, a capacitor 21 that smooths the input voltage of the inverter 20. The capacitor 21 has a higher potential-side terminal connected to a long higher potential-side electrical pathway 31H composed of a conductive member such as a bus-bar. The capacitor 21 has a lower potential-side terminal connected to a long lower potential-side electrical pathway 31L composed of a conductive member such as a bus-bar.

The positive electrode terminal of the battery 30 is connected to the higher potential-side electrical pathway 31H. In addition, in the higher potential-side electrical pathway 31H, the drains of the upper arm switches SUH to SWH are connected to the side opposite to the battery 30 with respect to the connection point to the capacitor 21.

The negative electrode terminal of the battery 30 is connected to the lower potential-side electrical pathway 31L. In addition, in the lower potential-side electrical pathway 31L, the sources of the lower arm switches SUL to SWL are connected to the side opposite to the battery 30 with respect to the connection point to the capacitor 21.

The control system includes a current sensor 40 and an angle sensor 41. The current sensor 40 detects at least a two-phase current among the respective phase currents flowing through the rotating electrical machine 10. According to the present embodiment, the detection value of a phase current flowing in the direction from the inverter 20 toward the winding is considered positive. The angle sensor 41, which is composed of, for example, a resolver or a hole element, outputs information on a rotation angle of the rotor of the rotating electrical machine 10.

Output signals of the current sensor 40 and angle sensor 41 are input to the control device 50 included in the control system. The control device 50, which is composed mainly of a microcomputer, performs switching operation for the respective switches SUH to SWL of the inverter 20, for feedback control of a controlled quantity for the rotating electrical machine 10 to a command value. According to the present embodiment, the controlled quantity is an electrical angular velocity (rotational velocity), and the command value thereof is a command angular velocity $\omega^*$.

The control device 50 performs switching operation for the respective switches SUH to SWL of the inverter 20, such that the voltage vector applied to the rotating electrical machine 10 is a command voltage vector Vtr for controlling the electrical angular velocity to the command angular velocity $\omega^*$. Thus, sinusoidal phase currents that are shifted by 120 degrees from each other flow through the respective phase windings 11U, 11V, and 11W.

More particularly, the control device 50 executes programs stored in a memory device included in the control device 50 itself, thereby achieving various control functions. The various functions may be achieved by electronic circuits as hardware, or may be achieved by both hardware and software.

Subsequently, processing executed by the control device 50 will be described in detail with reference to the block diagram of FIG. 2. It is to be noted that while a velocity control system in which the controlled quantity is an electrical angular velocity (rotational velocity), as a control system constituting the control device 50, will be described as an example in the present embodiment, the control system may be, without limitation to the example, for example, a torque (current) control system in which the controlled quantity is a torque.

A velocity deviation calculation unit 51 subtracts the electrical angular velocity $\omega e$ from the command angular velocity $\omega^*$, thereby calculating a velocity deviation $\Delta\omega$. The electrical angular velocity $\omega e$ is, based on an electrical angle $\theta e$, calculated by a velocity calculation unit 52.

A velocity controller 53 calculates a command torque Trq* for the rotating electrical machine 10 as an operational quantity for feedback control of the velocity deviation $\Delta\omega$ to 0. It is to be noted that proportional integral control, for example, may be used as the feedback control in the velocity controller 53.

A current conversion unit 54 converts, based on the electrical angle $\theta e$ and the phase current detected by the current sensor 40, U, V, and W phase currents in a UVW coordinate system as a three-phase fixed coordinate system, to a d-axis current Idr and a q-axis current Iqr in a dq coordinate system as a two-phase rotating coordinate system.

A command current setting unit 55 sets, based on a command torque Trq*, a d-axis command current Id* and a q-axis command current Iq*.

A model predictive control unit 56 determines, for each control cycle Tc, a voltage vector for use in each of a plurality of prediction cycles Te constituting one control cycle Tc. According to the present embodiment, for the sake of description, one prediction cycle Tp is set to have a period obtained by dividing one control cycle Tc into equal quarters. Without limitation to this setting, however, one prediction cycle Tp may be set to have a period that is shorter than the above-mentioned period obtained by dividing into equal quarters.

The model predictive control unit 56 outputs, for each control cycle Tc, switching modes (specifically, respective operational signals gUH to gWL) corresponding to each of the four voltage vectors predicted. A method for determining the voltage vectors will be described below in detail.

The model predictive control unit 56 includes a current prediction unit 56a. The current prediction unit 56a predicts d-axis currents Ide(n+1) to Ide(n+4), q-axis currents Iqe(n+1) to Iqe(n+4), and capacitor currents Ic(n+1) to Ic(n+4) as currents flowing through the capacitor 21 in the respective combinations of voltage vectors in one control cycle Tc. In this regard, in the description of the d-axis current as an example, Ide(n+1) represents a predicted value of the d-axis current at the timing after a lapse of one prediction cycle Tp from the present, and Ide(n+4) represents a predicted value of the d-axis current at the timing after a lapse of four prediction cycles "4×Tp" from the present. According to the present embodiment, six active voltage vectors and two reactive (inactive) voltage vectors are temporarily set for each of the four prediction cycles. Thus, the fourth power of 8 (4096) combinations of voltage vectors are temporarily set in one control cycle.

The current prediction at the timing after a lapse of one prediction cycle Tp from the present, of the processing executed by the current prediction unit 56a, will be described with reference to FIG. 3. This processing is repeatedly executed for each control cycle Tc.

In step S10, a variable i is set to 0.

In step S11, based on an i-th vector Vi, the electrical angle θe, the electrical angular velocity ωe, and d-axis and q-axis currents Idr(n) and Iqr(n) in the current control cycle, calculated by the current conversion unit 54, the d-axis and q-axis currents Ide(n+1) and Iqe(n+1) at the timing after a lapse of one prediction cycle are calculated in the case where the voltage vector is temporarily set to the i-th voltage vector Vi. The d-axis and q-axis currents Ide(n+1) and Iqe(n+1) may be calculated, for example, with the use of the following formula (eq1).

[Mathematical Formula 1]

$$\begin{bmatrix} V_d \\ V_q \end{bmatrix} = \begin{bmatrix} R & -\omega_e \cdot L_q \\ \omega_e \cdot L_d & R \end{bmatrix} \begin{bmatrix} I_{dr} \\ I_{qr} \end{bmatrix} + \begin{bmatrix} 0 \\ \omega_e \cdot K_E \end{bmatrix} + \frac{1}{T_p} \begin{bmatrix} L_d & 0 \\ 0 & L_q \end{bmatrix} \begin{bmatrix} \Delta I_d \\ \Delta I_q \end{bmatrix} \quad (\text{eq 1})$$

In the foregoing formula (eq1), R represents a winding resistance, Ld and Lq respectively represent d-axis inductance and q-axis inductance, KE represents a back electromotive force constant, and ΔId and ΔIq respectively represent the amounts of changes in d-axis and q-axis currents in one prediction cycle Tp. ΔId and ΔIq are calculated by inputting the d-axis and q-axis currents Idr(n) and Iqr(n), the electrical angular velocity ωe, and d-axis and q-axis voltages Vd and Vq into the foregoing formula (eq1). Then, the d-axis and q-axis currents Ide(n+1) and Iqe(n+1) may be calculated respectively from "Ide(n+1)=Idr(n)+ΔId" and "Iqe(n+1)=Iqr(n)+ΔIq". In this regard, the d-axis and q-axis voltages Vd and Vq may be calculated, based on the i-th voltage vector Vi and the electrical angle θe.

Figures 4, 5:
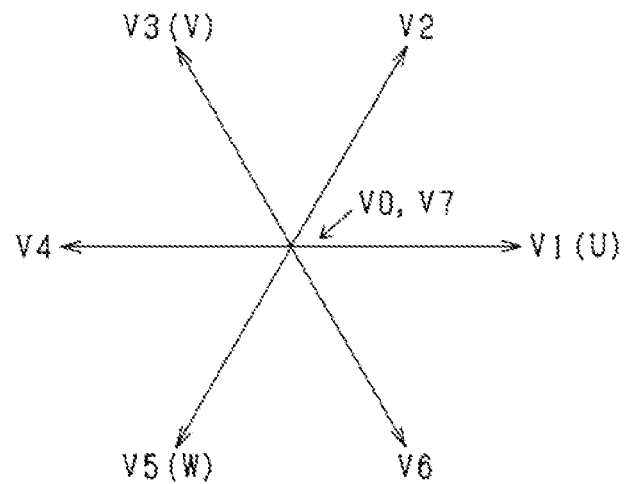
FIG. 4 is a diagram illustrating voltage vectors.
FIG. 5 is a diagram showing a relationship among voltage vectors, switching modes, and inverter currents.

FIG. 4 shows voltage vectors temporarily set in step S11. First to sixth voltage vectors V1 to V6 are active voltage vectors, and 0-th and seventh voltage vectors V0 and V7 are reactive voltage vectors. FIG. 5 shows a relationship between each voltage vector and a switching mode.

Figure 3:
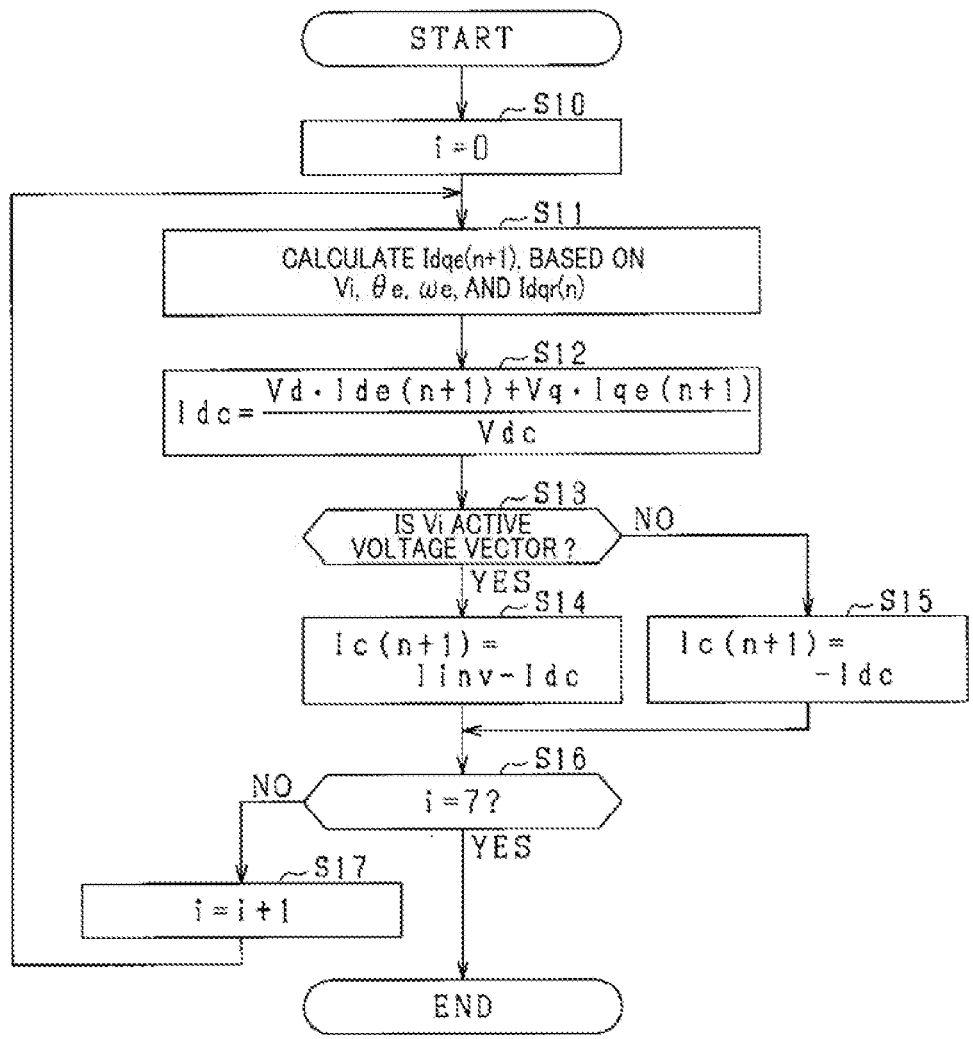
FIG. 3 is a flowchart showing a procedure of processing for predicting d-axis and q-axis currents and a capacitor current.

Returning to the previous description of FIG. 3, a power supply current Idc that is a current flowing through the battery 30 at the timing after a lapse of only one prediction cycle is calculated in step S12. According to the present embodiment, the power supply current Idc is calculated with the use of the following formula (eq2).

[Mathematical Formula 2]

$$I_{dc} = \frac{V_d \cdot I_{de}(n+1) + V_q \cdot I_{qe}(n+1)}{V_{dc}} \quad (\text{eq 2})$$

In the foregoing formula (eq2), the d-axis and q-axis voltages Vd and Vq may be calculated, based on the i-th voltage vector Vi and electrical angle θe selected in step S11. It is to be noted that the power supply current Idc is considered positive in the case of discharging from the battery 30.

In step S13, whether the i-th voltage vector Vi temporarily set in step S11 is an active voltage vector is determined.

If it is determined that the i-th voltage vector Vi is an active voltage vector in step S13, the processing proceeds to step S14 in which the capacitor current Ic(n+1) at the timing after a lapse of only one prediction cycle is calculated with the use of the relation equation of "Ic(n+1)=Iinv−Idc". In the period in which the i-th voltage vector Vi is considered as an active voltage vector, discharging is performed from the capacitor 21. In this regard, the capacitor current Ic is considered positive in the case of discharging from the capacitor 21. In addition, Iinv represents an inverter current that is a current flowing through the higher potential-side electrical pathway 31H toward the inverter 20 from the connection point to the capacitor 21. The inverter current Iinv is considered positive in the direction of flowing through the higher potential-side electrical pathway 31H toward the inverter 20 from the connection point to the capacitor 21.

The inverter current Iinv can be, as shown in FIG. 5, determined from the temporarily set voltage vector. For example, in the case where the first voltage vector V1 is temporarily set, the inverter current Iinv is "IU", and the U phase current detected by the current sensor 40 is thus used as the inverter current Iinv. In addition, for example, in the case where the second voltage vector V2 is selected, the inverter current Iinv is "−IW", and the value obtained by multiplying the W phase current detected by the current sensor 40 by "−1" is thus used as the inverter current Iinv.

If it is determined that the i-th voltage vector Vi is a reactive voltage vector in step S13, the processing proceeds to step S15 in which the capacitor current Ic(n+1) is calculated with the use of the relation equation of "Ic(n+1)=−Idc". In the period in which the i-th voltage vector Vi is considered as a reactive voltage vector, the capacitor 21 is charged, and the capacitor current Ic(n+1) thus has a negative value.

More particularly, in the case where the control system includes therein a power supply current sensor that detects a current flowing through the battery 30, the power supply current Idc for use in steps S14 and S15 may be considered as a detection value of the power supply current sensor.

In step S16, whether the variable i is 7 is determined. If the determination is negative in step S16, the processing proceeds to step S17 in which the variable i is incremented, and proceeds to step S11. In contrast, if the determination is affirmative in step S16, the current prediction at the timing after a lapse of only one prediction cycle is ended.

FIG. 6 shows an example of eight d-axis and q-axis currents Ide(n+1) and Iqe(n+1) and capacitor currents Ic(n+1) at the timing after a lapse of only one prediction cycle Tp from the present.

Figure 7:
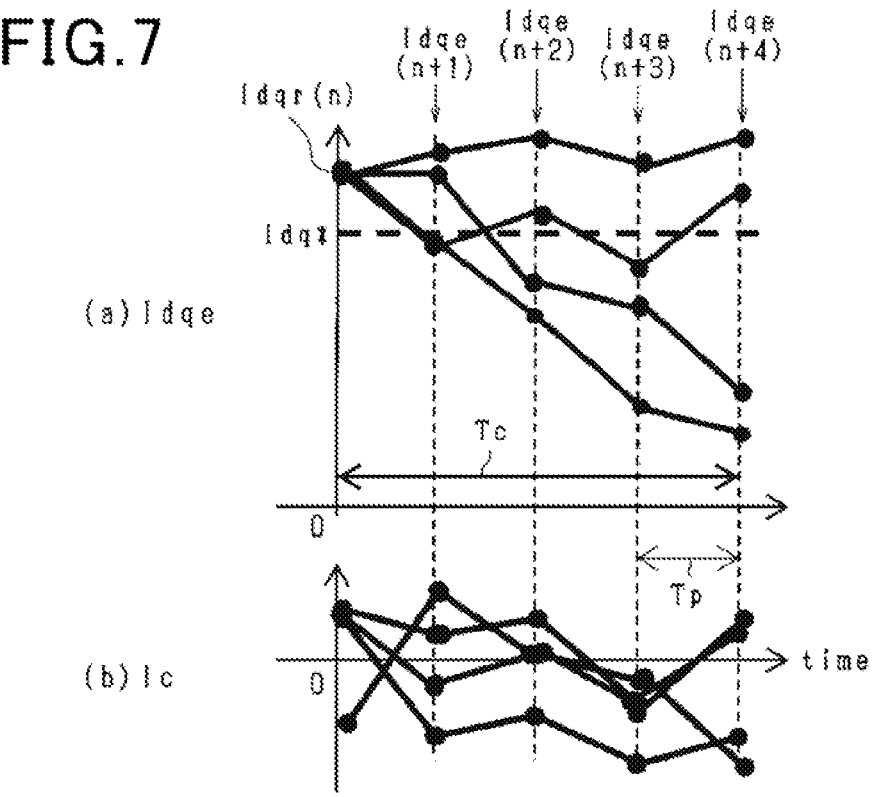
FIG. 7 is a diagram showing an example of a result of predicting currents in one control cycle.

Thereafter, the current prediction unit 56a predicts, based on the d-axis and q-axis currents Ide(n+1) and Iqe(n+1) at the timing after a lapse of only one prediction cycle Tp, d-axis and q-axis currents Ide(n+2) and Iqe(n+2) at the timing after a lapse of only two prediction cycles in accordance with the same approach as the approach described with reference to FIG. 3, and predicts, based on the d-axis and q-axis currents Ide(n+2) and Iqe(n+2) at the timing after a lapse of only two prediction cycles, d-axis and q-axis currents Ide(n+3) and Iqe(n+3) at the timing after a lapse of only three prediction cycles. Then, the current prediction unit 56a predicts, based on the d-axis and q-axis currents Ide(n+3) and Iqe(n+3) at the timing after a lapse of only three prediction cycles, d-axis and q-axis currents Ide(n+4) and Iqe(n+4) at the timing after a lapse of only four prediction cycles. The values at the timings after lapses of two to four prediction cycles are predicted for the capacitor current Ic. FIG. 7 shows an example of the result of the current predictions at the timings after lapses of one to four prediction cycles. In FIG. 7, for the sake of convenience, the prediction results are shown for four combinations among all the combinations of the voltage vectors in one control cycle.

Figure 2:
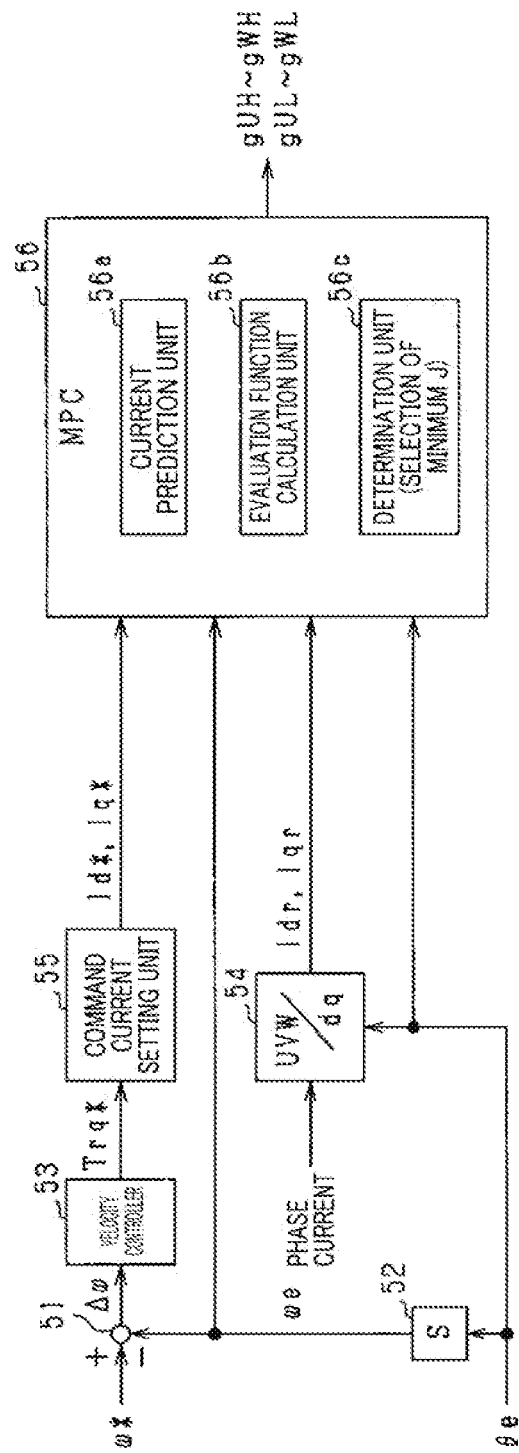
FIG. 2 is a block diagram illustrating processing executed by a control device.

Returning to the previous description of FIG. 2, the model predictive control unit 56 includes an evaluation function calculation unit 56b and a determination unit 56c. The evaluation function calculation unit 56b calculates an evaluation function J represented by the following formula (eq3) for each of all the combinations of the voltage vectors temporarily set in one control cycle.

[Mathematical Formula 3]

$$J = W_{id}\sum_{k=1}^{4}|I_{d*} - I_{de}(n+k)| + W_{iq}\sum_{k=1}^{4}|I_{q*} - I_{qe}(n+k)| + W_{ic} \cdot I_{cRMS} \quad (eq\ 3)$$

In the foregoing formula (eq3), Wid represents a weighting factor for a deviation of a d-axis current prediction value with respect to the d-axis command current Id*, and Wiq represents a weighting factor for a deviation of a q-axis current prediction value with respect to the q-axis command current Iq*. Wic represents a weighting factor for a capacitor current, and IcRMS represents the effective value of four predicted values for the capacitor current Ic in one control cycle.

The determination unit 56c selects the smallest evaluation function from among the respective evaluation functions J calculated by the evaluation function calculation unit 56b.

Figure 8:
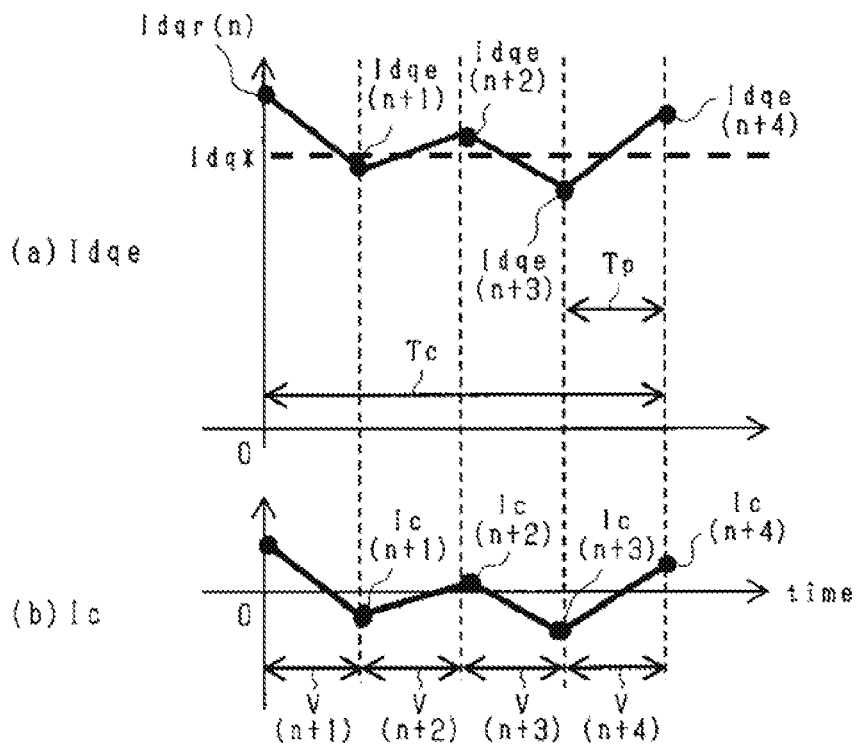
FIG. 8 is a diagram showing an example of a result of predicting currents in one control cycle.

The determination unit 56c determines, as voltage vectors for use in control, four voltage vectors V(n+1) to V(n+4) for one control cycle corresponding to the selected evaluation function J. FIG. 8 shows a prediction result for the minimum evaluation function J, among the four prediction results shown in FIG. 7. The four voltage vectors V(n+1) to V(n+4) determined are sequentially used in the next control cycle. The determination unit 56c generates the operational signals gUH to gWL respectively corresponding to the four voltage vectors V(n+1) to V(n+4), and sequentially outputs the operational signals gUH to gWL to the respective switches SUH to SWL.

The present embodiment described above in detail provides the following advantageous effects.

Multiple combinations of voltage vectors in one control cycle Tc are temporarily set, and the d-axis and q-axis currents and the capacitor current are predicted in each case of the temporary settings. Then, the evaluation function J with the deviations between the predicted d-axis and q-axis currents and the d-axis and q-axis command currents Id* and Iq* and the effective value of the capacitor current as input parameters are calculated for each of the temporarily set combinations of the voltage vectors. Then, based on the calculated evaluation function J, four voltage vectors are determined, which are employed in the next control cycle. This configuration can reduce a ripple current flowing through the capacitor 21, regardless of the operating area of the rotating electrical machine 10. In addition, there is no need to adapt the combinations of voltage vectors capable of reducing the capacitor current at the time of designing the control device 50, and the burden in designing the control device 50 can be thus also reduced.

In each of the prediction cycles Tp obtained by dividing one control cycle Tc into multiple cycles, multiple combinations of voltage vectors are temporarily set, and the d-axis and q-axis currents and the capacitor current are predicted in each case of the temporary settings. This makes it possible to shorten the switching cycle of the switching mode, and thus enhance the effect of reducing a ripple current flowing through the capacitor 21.

Modification Example 1 of First Embodiment

Figure 9:
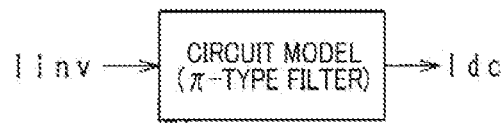
FIG. 9 is a diagram illustrating a π-type filter according to Modification Example 1 of the first embodiment.
Figure 10:
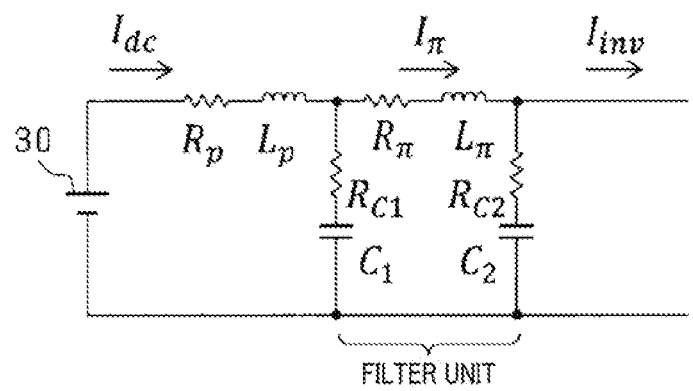
FIG. 10 is a diagram illustrating a detailed configuration of the π-type filter.

The power supply current Idc for use in the calculation of the capacitor current Ic may be calculated with the use of the π-type filter circuit model shown in FIG. 9. FIG. 10 shows therein details of the model. In FIG. 10, Rp and Lp represent parasitic resistance and parasitic inductance components of respective electrical pathways 31H and 31L, Rπ, Rc1, and Rc2 represent ESR components of a filter unit, Lπ represents an inductance component of the filter unit, and C1 and C2 represent capacitive components of the filter unit. In addition, Iπ represents a current flowing through the filter unit. From the circuit diagram shown in FIG. 10, the following formulas (eq4) and (eq5) are derived. In the following formulas (eq4) and (eq5), s represents a Laplace operator.

[Mathematical Formula 4]

$$0 = (R_p + L_p \cdot s)I_{dc} + \left(R_{c1} + \frac{1}{C_1 \cdot s}\right)(I_{dc} - I_\pi) \quad (eq\ 4)$$

[Mathematical Formula 5]

$$\left(R_{c1} + \frac{1}{C_1 \cdot s}\right)(I_{dc} - I_\pi) = (R_\pi + L_\pi \cdot s)I_\pi + \left(R_{c2} + \frac{1}{C_2 \cdot s}\right)(I_\pi - I_{inv}) \quad (eq\ 5)$$

The foregoing formula (eq4) can be converted to the following formula (eq6), and the foregoing formula (eq5) can be converted to the following formula (eq7).

[Mathematical Formula 6]

$$I_{dc} = \frac{R_{c1} + \frac{1}{C_1 \cdot s}}{R_p + L_p \cdot s}(I_\pi - I_{dc}) = B(s)(I_\pi - I_{dc}) \quad \text{(eq 6)}$$

[Mathematical Formula 7]

$$I_\pi = -\frac{R_{c1} + \frac{1}{C_1 \cdot s}}{R_\pi + L_\pi \cdot s}(I_\pi - I_{dc}) + \frac{R_{c2} + \frac{1}{C_2 \cdot s}}{R_\pi + L_\pi \cdot s}(I_\pi \cdot I_{inv}) = \quad \text{(eq 7)}$$
$$-C(s)(I_\pi - I_{dc}) + A(s)(I_\pi - I_{inv})$$

Figure 11:
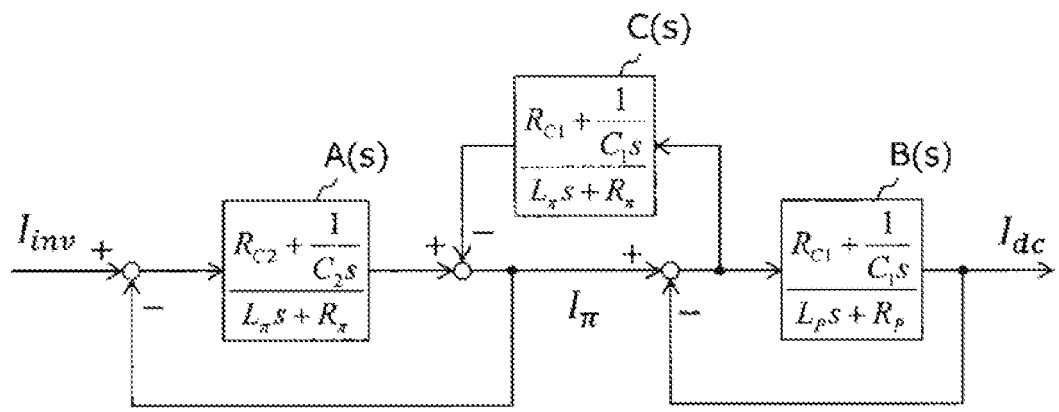
FIG. 11 is a block diagram of the π-type filter.

From the foregoing formulas (eq6) and (eq7), the block diagram shown in FIG. 11 can be derived. According to this block diagram, the power supply current Idc can be calculated by inputting the inverter current Iinv. It is to be noted that Rp, Rπ, Rc1, Rc2, and Lp may be set to 0 in the block diagram of FIG. 11.

Modification Example 2 of First Embodiment

The term of the effective value IcRMS may be deleted from the right-hand side of the foregoing formula (eq3). In this case, the determination unit 56c selects combinations in which the predicted capacitor current in one control cycle will not exceed the upper acceptance value Ilimt (see FIG. 6(b)), among all the combinations of voltage vectors in one control cycle. Then, the determination unit 56c may employ, among the selected combinations, four voltage vectors constituting the combination for the smallest evaluation function J, in the next control cycle. This makes it possible to reduce the maximum value of the capacitor current.

Figure 12:
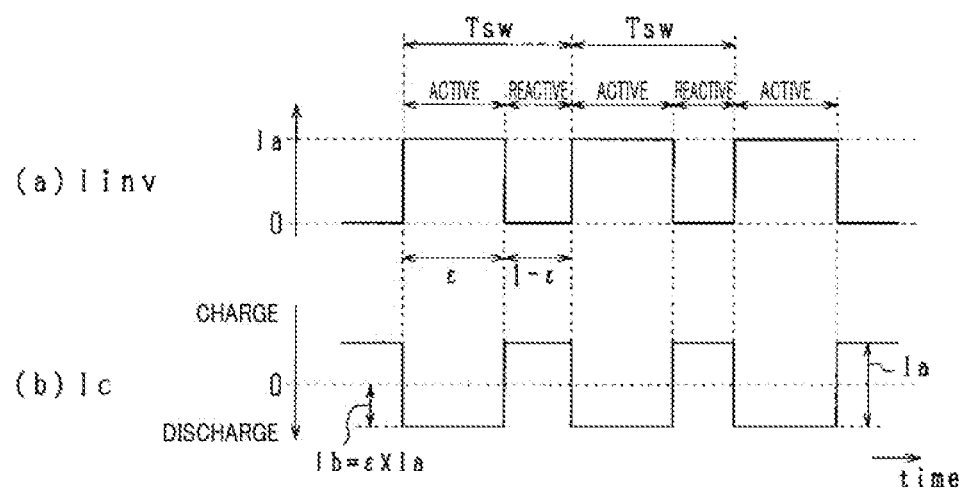
FIG. 12 is a timing chart showing changes in an inverter current and a capacitor current.

In addition, in this case, the upper acceptance value Ilimt may be variable, based on the operating point (specifically, for example, modulation factor or phase current) of the rotating electrical machine 10. This configuration will be described below with reference to FIGS. 12 and 13. FIG. 12(a) shows changes in inverter current Iinv, and FIG. 12(b) shows changes in capacitor current Ic. In FIG. 12, a period ε(0<ε<1) in which the voltage vector applied to the rotating electrical machine 10 is considered as an active voltage vector and a period "1−ε" in which the voltage vector is considered as an reactive voltage vector are adapted to appear alternately for the sake of simplification. ε is determined by the switching pattern and the like of each switch constituting the inverter 20. In FIG. 12, Tsw represents one switching cycle for a switch constituting the inverter 20, and Ia represents the magnitude of the inverter current Iinv flowing in the period with the voltage vector considered as an active voltage vector.

In the period with the voltage vector considered as an active voltage vector, discharging is performed from the capacitor 21, and the capacitor current Ic thus has a positive value. The discharge current of the capacitor 21 has a magnitude of Ib (=ε×Ia). In contrast, in the period with the voltage vector considered as a reactive voltage vector, the capacitor 21 is charged with a current supplied from the battery 30, and the capacitor current Ic thus has a negative value. The difference between the capacitor current Ic in the period with the voltage vector considered as an active voltage vector and the capacitor current Ic in the period with the voltage vector considered as a reactive voltage vector represents the magnitude Ia of a ripple current flowing through the capacitor 21. The effective value Icrms of the ripple current is represented by the following formula (eq8).

[Mathematical Formula 8]

$$I_{crms} = \int_0^\varepsilon \sqrt{(I_a - \varepsilon \cdot I_a)^2}\, dt + \int_\varepsilon^1 \sqrt{(-\varepsilon \cdot I_a)^2}\, dt = 2I_a \cdot \varepsilon(1-\varepsilon) \quad \text{(eq 8)}$$

Figure 13:
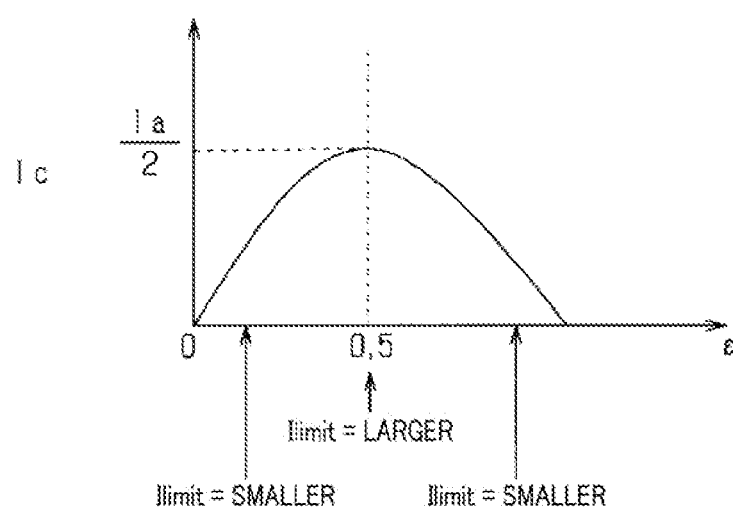
FIG. 13 is a diagram showing a relationship between an active voltage vector period and a capacitor current.

The right-hand side of the foregoing formula (eq8) reaches a maximum value Ia/2 in the case of ε=0.5 as shown in FIG. 13. In this regard, the upper acceptance value Ilimt at an operating point with ε around 0.5 may be set to be larger than the upper acceptance value Ilimt at an operating point with ε far from 0.5 in value.

In addition, in the case of deleting the term of the effective value IcRMS from the right-hand side of the foregoing formula (eq3), the determination unit 56c may select combinations in which the predicted capacitor current in one control cycle has a minimum effective value, from among all the combinations of voltage vectors in one control cycle. Then, the determination unit 56c may employ, among the selected combinations, four voltage vectors constituting the combination for the smallest evaluation function J, in the next control cycle.

Second Embodiment

Figure 14:
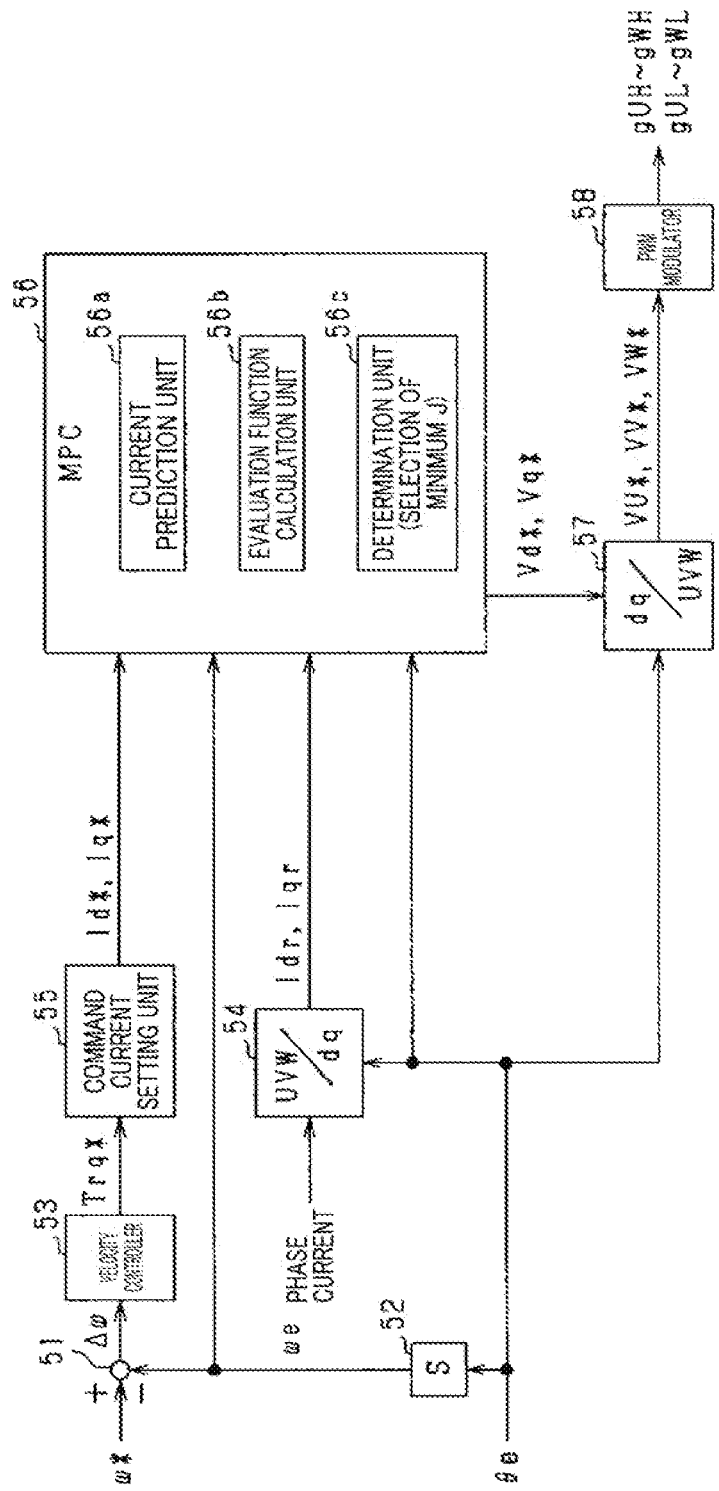
FIG. 14 is a block diagram illustrating processing executed by a control device according to a second embodiment.

A second embodiment will be described below with reference to the drawings, mainly by differences from the first embodiment. According to the present embodiment, PWM control is used as shown in FIG. 14. It is to be noted that the same components as the components previously illustrated in FIG. 2 are denoted by the same reference signs for the sake of convenience in FIG. 14.

The determination unit 56c calculates, with the use of the electrical angle θe, d-axis and q-axis command voltages Vd* and Vq* respectively corresponding to four voltage vectors V(n+1) to V(n+4) determined.

A voltage conversion unit 57 converts, based on the d-axis command voltage Vd*, the q-axis command voltage Vq*, and the electrical angle θe, the d-axis and q-axis command voltages Vd* and Vq* in the dq coordinate system to U, V, and W phase command voltages VU*, VV*, and VW* in the UVW coordinate system. According to the present embodiment, the U, V, and W phase command voltages VU*, VV*, and VW* have waveforms with phases shifted by 120° in electrical angle from each other.

A PWM modulator 58 generates respective operational signals gUH to gWL by three-phase modulation based on comparison in magnitude between the U, V, and W phase command voltages VU*, VV*, and VW* output from the voltage conversion unit 57 and carrier signals (triangular wave signals). The PWM modulator 58 outputs the respective operational signals gUH to gWL generated to the respective switches SUH to SWL of the invertor 20.

According to the present embodiment described above, the switching frequency of each switch constituting the inverter 20 can be made constant, and white noise generated with switching can be reduced.

Modification Example of Second Embodiment

The control device 50 may include, in place of the PWM modulator 58, a modulator that generates the respective operational signals gUH to gWL by space vector modulation (SVM) based on the respective command voltages VU*, VV*, and VW*.

Third Embodiment

Figure 15:
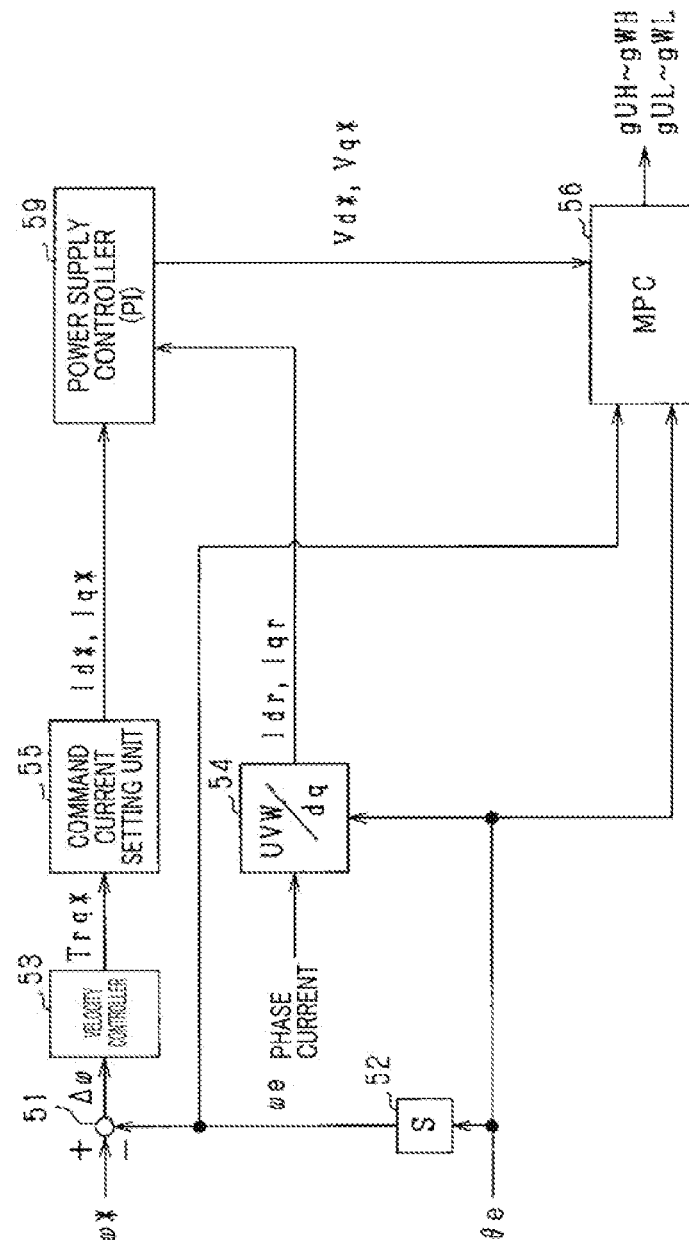
FIG. 15 is a block diagram illustrating processing executed by a control device according to a third embodiment.

A third embodiment will be described below with reference to the drawings, mainly by differences from the first embodiment. According to the present embodiment, current feedback control is used as shown in FIG. 15. It is to be noted that the same configurations as the configurations previously illustrated in FIG. 2 are denoted by the same reference signs for the sake of convenience in FIG. 15.

The control device 50 includes a current controller 59. The current controller 59 calculates a d-axis deviation ΔId as a value obtained by subtracting a d-axis current Idr from a d-axis command current Id*, and calculates, based on the d-axis deviation ΔId calculated, a d-axis command voltage Vd* that is an operational quantity for feedback control of the d-axis current Idr to the d-axis command current Id*. In addition, the current controller 59 calculates a q-axis deviation ΔIq as a value obtained by subtracting a q-axis current Iqr from a q-axis command current Iq*, and calculates, based on the q-axis deviation ΔIq calculated, a q-axis command voltage Vq* that is an operational quantity for feedback control of the q-axis current Iqr to the q-axis command current Iq*. According to the present embodiment, proportional integral control is used as the feedback control in the current controller 59. It is to be noted that the current controller 59 corresponds to a feedback operation unit according to the present embodiment.

Figure 16:
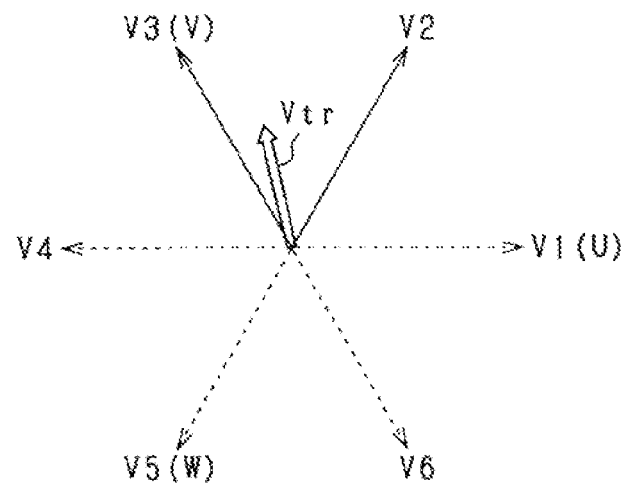
FIG. 16 is a diagram showing an example of an aspect of selecting 60-degree voltage vectors.

The model predictive control unit 56 temporarily sets combinations of voltage vectors in one control cycle, based on a command voltage vector Vtr in the dq coordinate system, determined by the d-axis and q-axis command voltages Vd* and Vq* calculated by the current controller 59. According to the present embodiment, among six active voltage vectors, two active voltage vectors (hereinafter, 60-degree voltage vectors) that sandwich the command voltage vector Vtr and have a phase difference of 60 degrees from each other, and two reactive voltage vectors are selected as the temporarily set combinations of voltage vectors. FIG. 16 shows an example of selecting second and third voltage vectors V2 and V3 as the two active voltage vectors that sandwich the command voltage vector Vtr.

It is to be noted that the method of calculating an evaluation function J to determine four voltage vectors, after temporarily setting the voltage vectors, is the same as in the first embodiment. The first and second terms of the right-hand side of the foregoing formula (eq3), however, may be deleted. In this case, the operation load of the control device 50 can be reduced.

According to the present embodiment described above, the number of the temporarily set combinations of voltage vectors can be reduced, and the operation load of the control device 50 can be reduced.

Modification Example of Third Embodiment

The evaluation function J may be calculated with the first and second terms left for the right-hand side of the foregoing formula (eq3). In this case, ripples of the d-axis and q-axis currents can be reduced.

Fourth Embodiment

A fourth embodiment will be described below with reference to the drawings, mainly by differences from the third embodiment. According to the present embodiment, the model predictive control unit 56 determines, as in the third embodiment, a command voltage vector Vtr from the d-axis and q-axis command voltages Vd* and Vq* calculated by the current controller 59. Then, the model predictive control unit 56 selects, as the temporarily set combinations of voltage vectors, two active voltage vectors (hereinafter, 120-degree voltage vectors) that sandwich the command voltage vector Vtr and have a phase difference of 120 degrees from each other, and one reactive voltage vector. The 120-degree voltage vectors are used for reducing a ripple current flowing through the capacitor 21.

Figure 17:
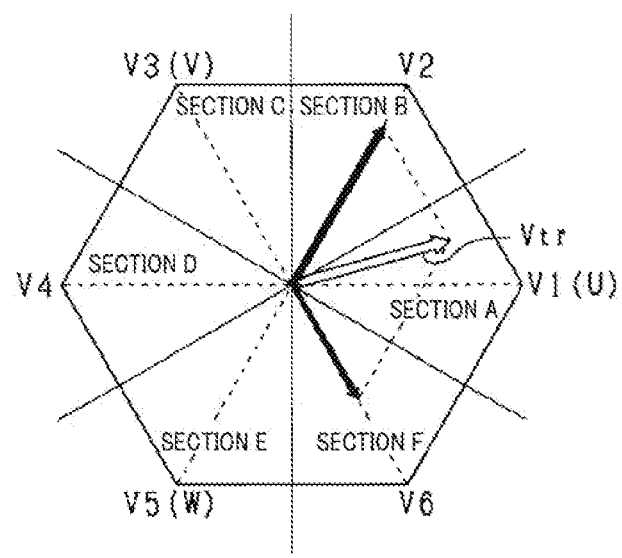
FIG. 17 is a diagram illustrating sections A to F according to a fourth embodiment.

Subsequently, a method for selecting the temporarily set combinations of voltage vectors will be described. As shown in FIG. 17, six sections A to F are partitioned by six reference lines arranged to be shifted by 60 degrees. In the description of the section A as an example, the pair of reference lines that partition the section A sandwiches a first voltage vector V1 and has a phase difference of 30 degrees from the first voltage vector V1.

Figure 18:
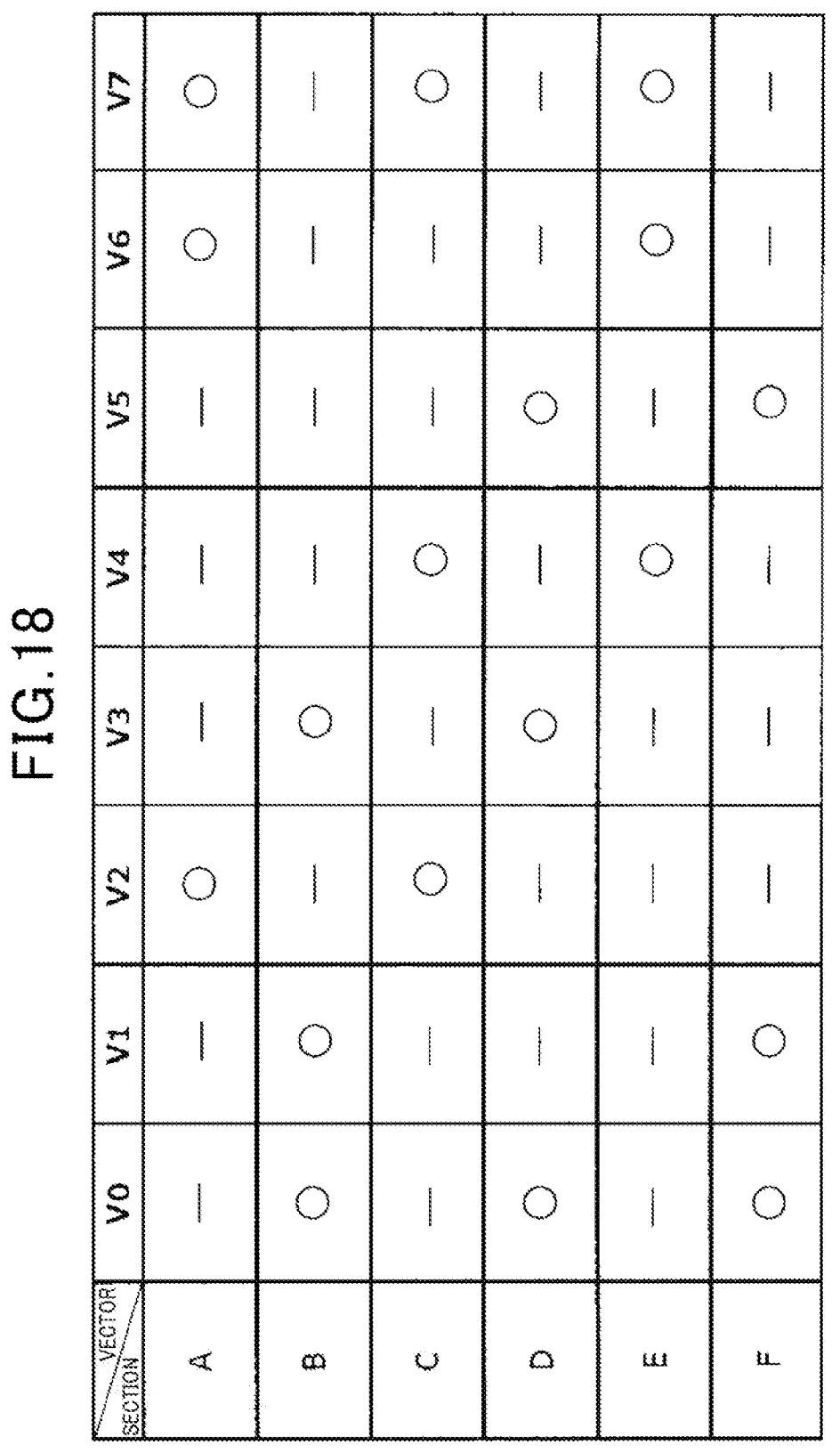

FIG. 18 shows 120-degree voltage vectors respectively corresponding to the sections A to F, and one reactive voltage vector. The model predictive control unit 56 selects, as the temporarily set combinations of voltage vectors, the combinations of 120-degree voltage vectors corresponding to the section to which the command voltage vector Vtr belongs and one reactive voltage vector. FIG. 17 shows 120-degree voltage vectors that are selected in the case where the command voltage vector Vtr belongs to the section A. Further, see the description of FIG. 13 and the like of JP 2018-196179 A for the information shown in FIG. 19 for reducing ripple currents.

According to the present embodiment described above, while reducing a ripple current flowing through the capacitor 21, the number of the temporarily set combinations of voltage vectors can be reduced, and the operation load of the control device 50 can be reduced.

More particularly, the configuration according to the present embodiment can be applied in an area where the modulation factor is less than or equal to a predetermined modulation factor (for example, ⅔).

Modification Example of Fourth Embodiment

For example, in the case where the command voltage vector Vtr belongs to the section A, the first voltage vector and a third voltage vector V3 may be selected as the 120-degree vectors. Also in this case, an advantageous effect according to the advantageous effect of the fourth embodiment can be achieved.

As shown in FIG. 19, the temporarily set combinations of voltage vectors may include therein two reactive voltage vectors.

Fifth Embodiment

A fifth embodiment will be described below with reference to the drawings, mainly by differences from the fourth embodiment. According to the present embodiment, the model predictive control unit 56 determines, as in the third embodiment, a command voltage vector Vtr from the d-axis and q-axis command voltages Vd* and Vq* calculated by the current controller 59. Then, the model predictive control unit 56 selects two 60-degree voltage vectors that sandwich the command voltage vector Vtr and have a phase difference of 60 degrees from each other. This selection processing corresponds to a first processing unit.

The model predictive control unit 56 selects, among 120-degree voltage vectors, an active voltage vector that is different from the active voltage vectors selected by the first processing unit. This selection processing corresponds to a second processing unit. The model predictive control unit 56 selects, as the combinations of voltage vectors, the three active voltage vectors selected.

Figure 20:
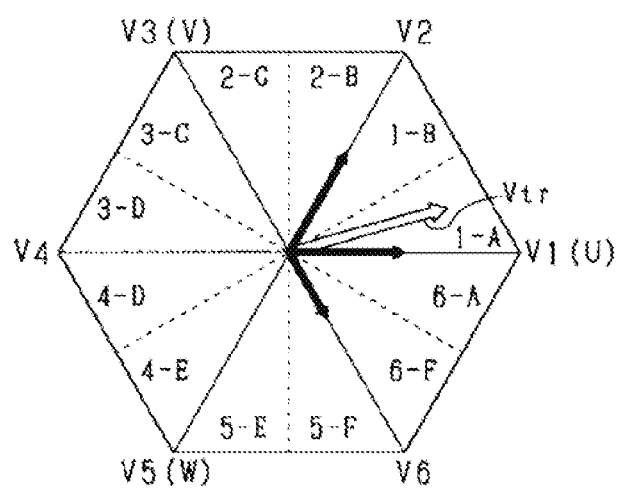
FIG. 20 is a diagram illustrating sections 1-A to 6-F according to a fifth embodiment.

Subsequently, a method for selecting the temporarily set combinations of voltage vectors will be described. As shown in FIG. 20, twelve sections 1-A to 6-A are partitioned by twelve reference lines arranged to be shifted by 30 degrees.

FIG. 21 shows three active voltage vectors respectively corresponding to the sections 1-A to 6-A. The model predictive control unit 56 selects, as the temporarily set combinations of voltage vectors, the combination of three active voltage vectors corresponding to the section to which the command voltage vector Vtr belongs. FIG. 20 shows three active voltage vectors that are selected in the case where the command voltage vector Vtr belongs to the section 1-A. Further, see the description of FIG. 9 and the like of JP 2018-196179 A for the information shown in FIG. 21.

According to the present embodiment, no reactive voltage vector is selected, and thus, the number of the temporarily set combinations of voltage vectors can be reduced, and the operation load of the control device 50 can be reduced.

More particularly, the configuration according to the present embodiment can be applied in an area where the modulation factor is more than the predetermined modulation factor mentioned above.

Sixth Embodiment

A sixth embodiment will be described below with reference to the drawings, mainly by differences from the fourth and fifth embodiments. According to the present embodiment, the temporarily set combination of voltage vectors is switched based on a modulation factor Mr.

Figure 22:
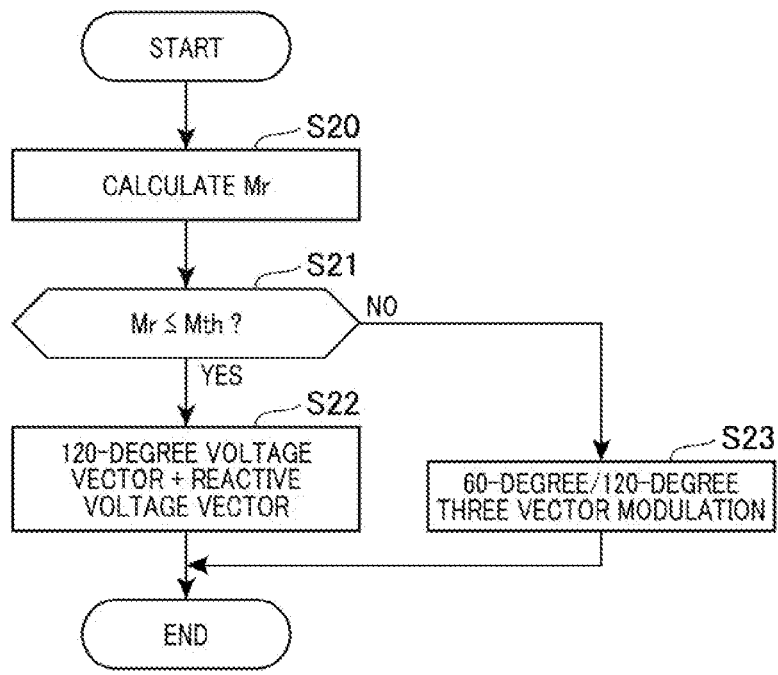
FIG. 22 is a flowchart showing a procedure of processing for selecting voltage vectors according to a sixth embodiment.

FIG. 22 shows a procedure of processing executed by the model predictive control unit 56. This processing is repeatedly executed in accordance with a predetermined control cycle.

In step S20, the modulation factor Mr is calculated. The modulation factor Mr is expressed by, for example, the following formula (eq9).

[Mathematical Formula 9]

$$M_r = \frac{\sqrt{V_{d*}^2 + V_{q*}^2}}{V_{dc}} \quad (\text{eq 9})$$

In step S21, whether the modulation factor Mr is less than or equal to a predetermined modulation factor Mth (for example, 2/3) is determined. If the determination is affirmative in step S21, the processing proceeds to step S22 in which a 120-degree voltage vector and two reactive voltage vectors are selected as the temporarily set combinations of voltage vectors.

In contrast, If the determination is negative in step S21, the processing proceeds to step S23 in which a 60-degree voltage vector selected by the first processing unit, and among 120-degree voltage vectors, an active voltage vector that is different from the active voltage vector selected by the first processing unit are selected as the temporarily set combinations of voltage vectors.

According to the present embodiment described above, even in the case where the rotating electrical machine 10 changes in the operating area, an appropriate combination of voltage vectors for reducing a ripple current flowing through the capacitor 21 can be selected while reducing the operation load of the control device 50.

Seventh Embodiment

A seventh embodiment will be described below with reference to the drawings, mainly by differences from the fourth to sixth embodiments. According to the present embodiment, a method for selecting a section is changed.

Figure 23:
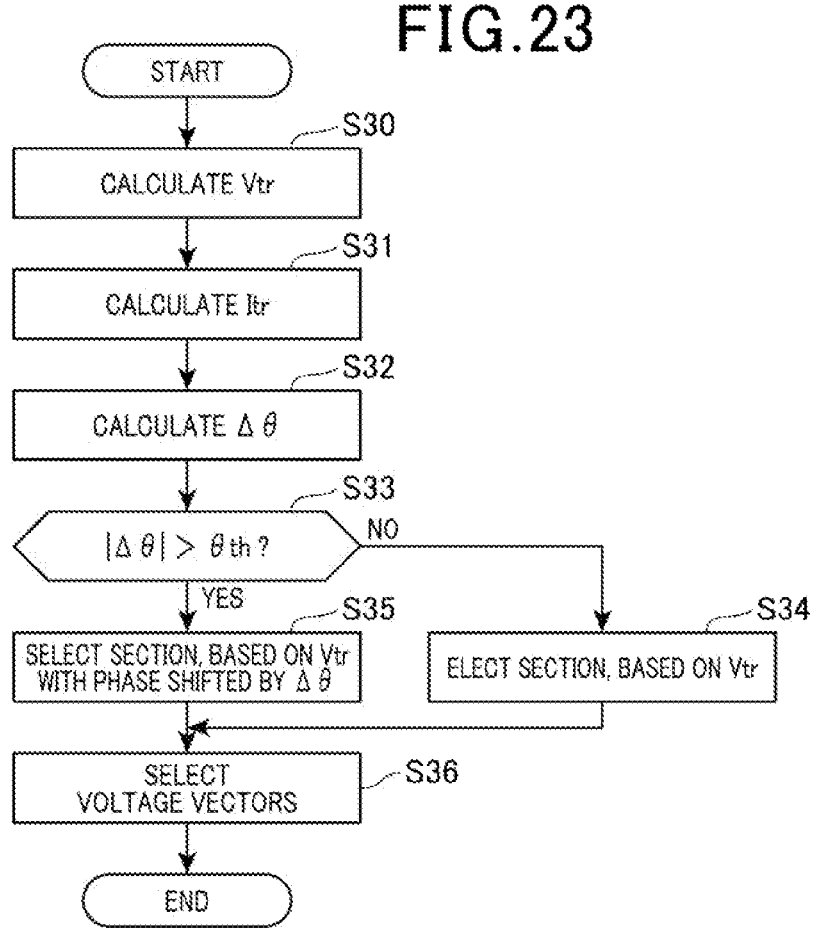
FIG. 23 is a flowchart showing a procedure of section determination processing according to a seventh embodiment.

FIG. 23 shows a procedure of section determination processing executed by the model predictive control unit 56. This processing is repeatedly executed in accordance with a predetermined control cycle.

In step S30, a command voltage vector Vtr is calculated from the d-axis and q-axis command voltages Vd* and Vq* calculated by the current controller 59.

In step S31, a current vector Itr flowing through the rotating electrical machine 10 is calculated. The current vector Itr may be calculated based on the phase current detected by the current sensor 40 and electrical angle θe.

Figure 24:
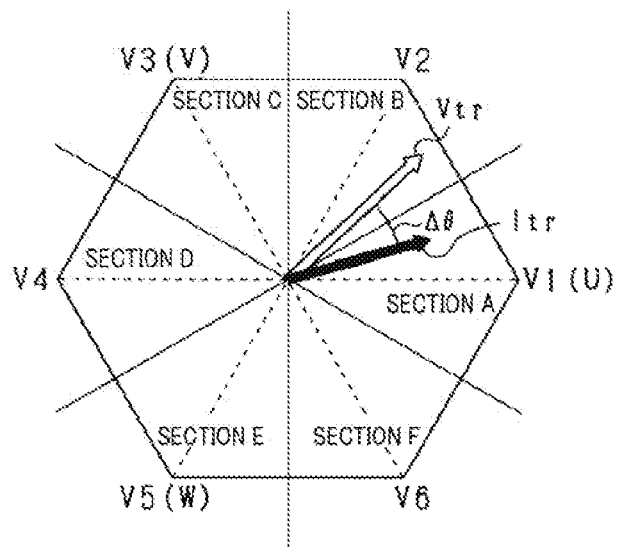
FIG. 24 is a diagram illustrating a phase difference between a voltage vector and a current vector.

In step S32, a phase difference Δθ (see FIG. 24) is calculated between the command voltage vector Vtr calculated in step S30 and the current vector Itr calculated in step S31.

In step S33, whether the absolute value of the phase difference Δθ calculated in step S32 is larger than a phase threshold θth (for example, 30 degrees) is determined. If the determination is negative in step S33, the processing proceeds to step S34 in which the section is selected to which the command voltage vector Vtr calculated in step S30 belongs. The selected section is any of the above-described sections shown in FIGS. 18, 19, and 21. It is to be noted that the section to which the current vector Itr belongs in place of the command voltage vector Vtr may be selected in step S34.

In contrast, if the determination is affirmative in step S33, the processing proceeds to step S35 in which the section is selected to which the vector obtained by shifting the phase of the command voltage vector Vtr calculated in step S30 by the phase difference Δθ calculated in step S32 belongs.

After the completion of the processing in step S34 or S35, the processing proceeds to step S36 in which voltage vectors corresponding to the selected section are selected by the same method as the method described in the fourth and fifth embodiments.

According to the present embodiment described above, the effect of reducing a ripple current flowing through the capacitor 21 can be further enhanced.

Modification Example of Seventh Embodiment

Steps S30 and S32 to S35 may be deleted, and after the completion of the processing in step S31, the section to which the current vector Itr belongs may be selected. In this case, the section may be selected without using the command voltage vector Vtr.

The current vector Itr in step S31 may be calculated based on the d-axis and q-axis command currents Id* and Iq*.

Eighth Embodiment

Figure 25:
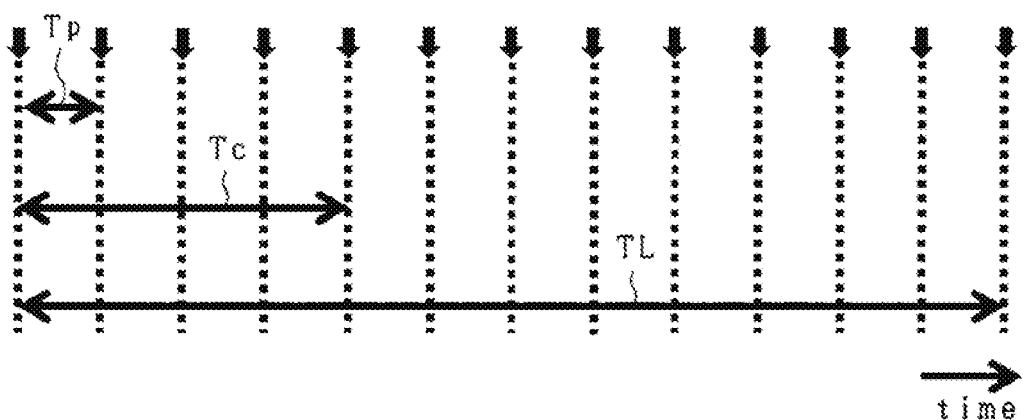
FIG. 25 is a diagram illustrating lengths of a prediction cycle, a control cycle, and a specified period according to an eighth embodiment.
Figure 26:
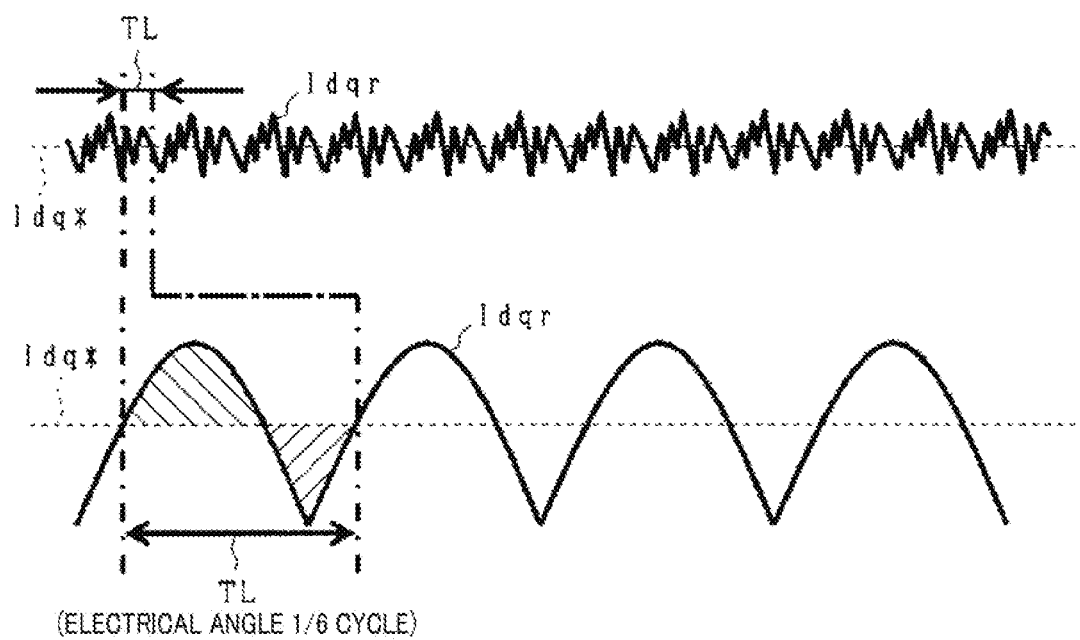
FIG. 26 is a timing chart schematically illustrating low-order harmonic components of d-axis and q-axis currents.

An eighth embodiment will be described below with reference to the drawings, mainly by differences from the first embodiment. According to the present embodiment, the model predictive control unit 56 predicts, as shown in FIG. 25, d-axis and q-axis currents and a capacitor current in a specified period TL for one or more cycles of N-th order harmonic components (N is an integer of 2 or more) of the d-axis and q-axis currents, which is a longer period than one control cycle Tc. Specifically, the model predictive control unit 56 sets, as shown in FIG. 26, the specified period TL to a period that is equal to one cycle of sixth-order harmonic components of the d-axis and q-axis currents.

According to the present embodiment described above, voltage vectors can be selected with the reduced variations of low-order harmonic components of the d-axis and q-axis currents.

Ninth Embodiment

A ninth embodiment will be described below with reference to the drawings, mainly by differences from the first embodiment. In accordance with the configuration described in the first embodiment, the model predictive control unit 56 operates the inverter 20 such that the switching frequency is equal (four times) in each control cycle. Thus, white noise can be reduced.

Figure 27:
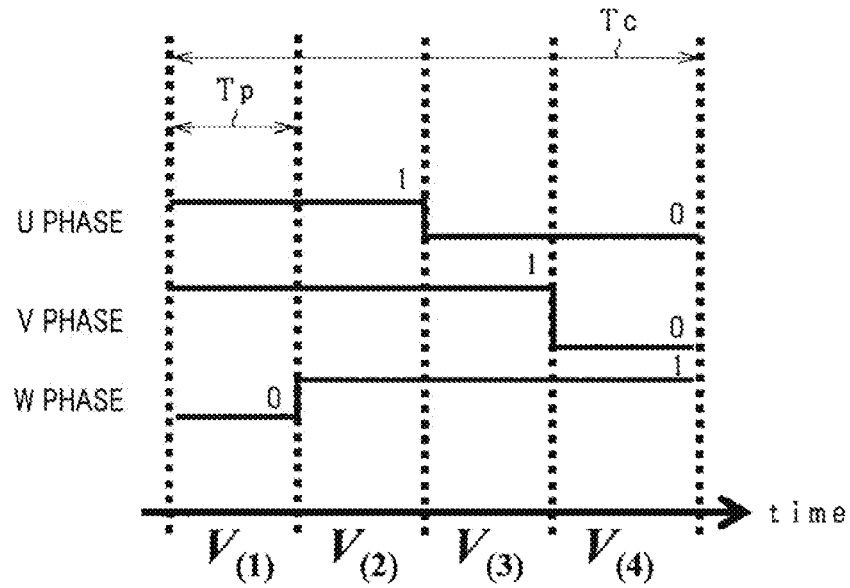
FIG. 27 is a timing chart showing an example of a switching aspect according to a ninth embodiment.

In this regard, the model predictive control unit 56 can operate, as shown in FIG. 27, the inverter 20 such that among the switches in phases, the switches in multiple phases are not simultaneously switched. Thus, surge voltages generated with switching the switches in the phases can be avoided, and faulty switches caused by the surge voltages can be avoided.

Figure 28:
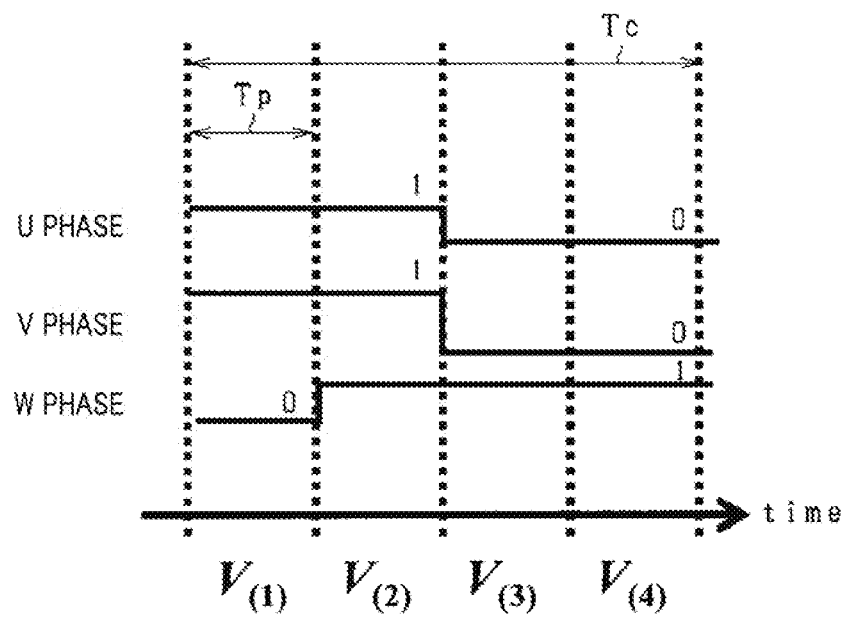
FIG. 28 is a timing chart showing an example of a switching aspect.

In addition, the model predictive control unit 56 can operate, as shown in FIG. 28, the inverter 20 while permitting, among the switches in phases, the switches in multiple phases to be simultaneously switched. Thus, combinations of voltage vectors can be achieved, which are different from the combinations of voltage vectors achieved by PWM modulation, and the degree of freedom can be increased for setting voltage vectors.

Tenth Embodiment

Figure 29:
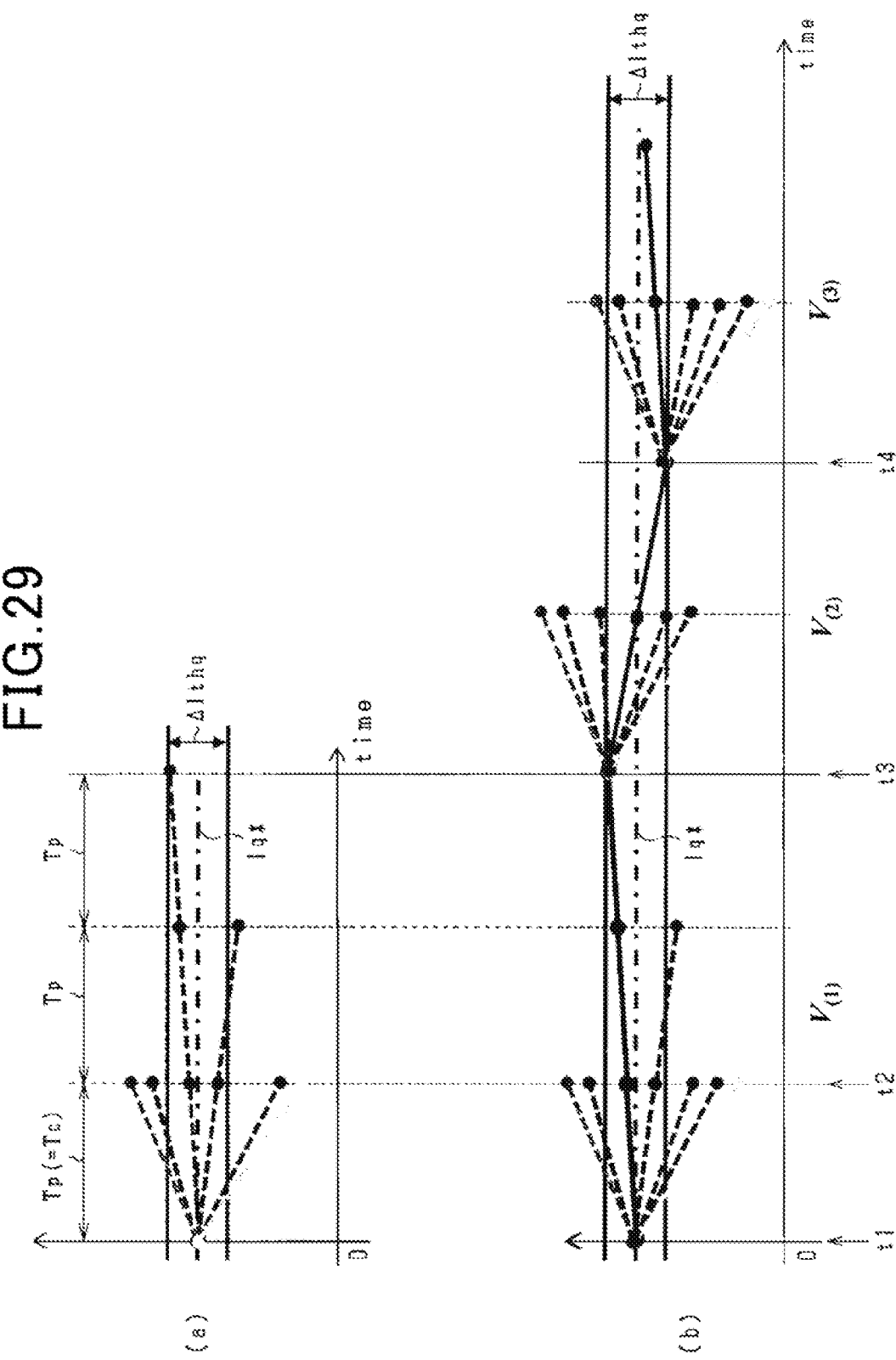
FIG. 29 is a timing chart illustrating an aspect of determining voltage vectors according to a tenth embodiment.

A tenth embodiment will be described below with reference to the drawings, mainly by differences from the first embodiment. According to the present embodiment, one prediction cycle Tp and one control cycle Tc are set to have the same period as shown in FIG. 29. The model predictive control unit 56 predicts, in the case where multiple voltage vectors are each temporarily set, d-axis and q-axis currents and a capacitor current at a timing t2 after a lapse of only one control cycle Tc from the present timing t1. Then, the model predictive control unit 56 performs linear extrapolation of the d-axis and q-axis currents and capacitor current predicted at each of the multiple voltage vectors temporarily set.

The model predictive control unit 56 sets a predetermined range ΔIthq with the present d-axis and q-axis command currents Id* and Iq* as median values, and determines, as voltage vectors employed next time, voltage vectors corresponding to the d-axis and q-axis currents at the latest timing t3 at which the capacitor current subjected to the linear extrapolation does not exceed the upper acceptance value Ilimt of the capacitor current and passes through the upper limit or lower limit of the predetermined range ΔIthq, of the d-axis and q-axis currents subjected to the linear extrapolation. In the example shown in FIG. 29, the switching mode is switched at the time t3 and time t4. It is to be noted that the predetermined range ΔIthq may be set to have, for example, a value that is less than or equal to ½ of the d-axis or q-axis command current Id* or Iq*.

According to the present embodiment described above, the switching frequency can be reduced.

Eleventh Embodiment

An eleventh embodiment will be described below with reference to the drawings, mainly by differences from the first embodiment. According to the present embodiment, a switching mode is determined offline without performing any online prediction.

Figure 30:
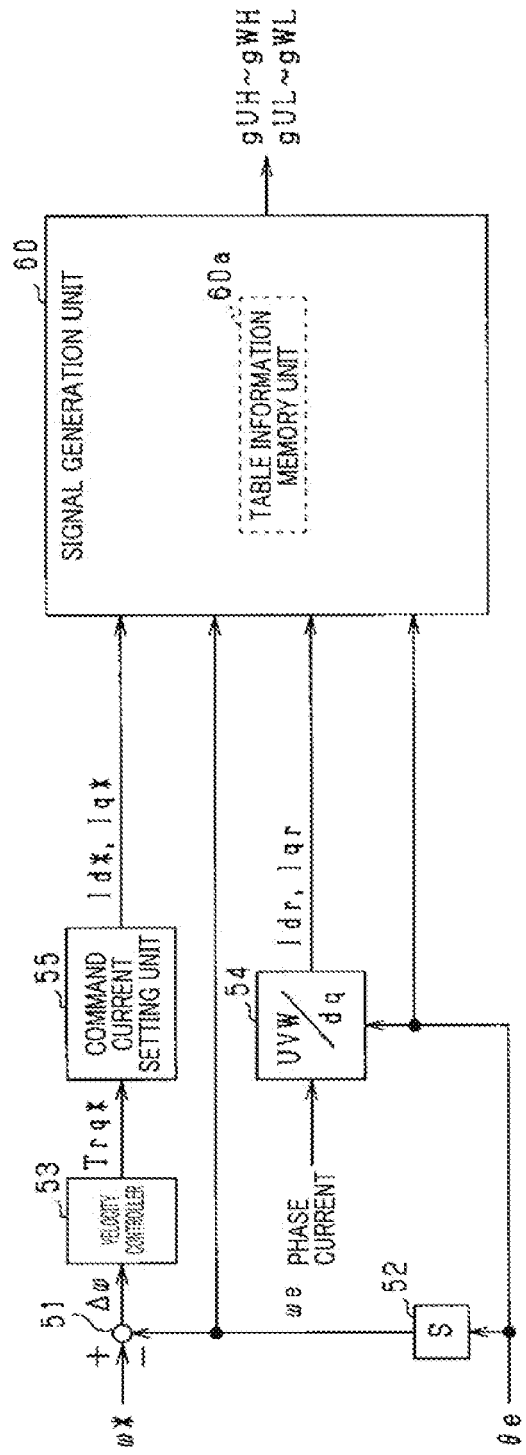
FIG. 30 is a block diagram illustrating processing executed by a control device according to an eleventh embodiment.

FIG. 30 shows a block diagram of a control device 50 according to the present embodiment. It is to be noted that the same components as the components previously illustrated in FIG. 2 are denoted by the same reference signs for the sake of convenience in FIG. 30.

The control device 50 includes a signal generation unit 60. The signal generation unit 60 has a table information memory unit 60a, and the table information memory unit 60a stores therein table information for unambiguously determining four voltage vectors in one control cycle Tc. The table information memory unit 60a is a non-transitory tangible recording medium other than an ROM (for example, a nonvolatile memory other than an ROM). The table information is information on four voltage vectors specified for one control cycle, which is associated with information regarding the operating area of the rotating electrical machine 10 and capable of minimizing a ripple current flowing through the capacitor 21. The signal generation unit 60 determines four voltage vectors, based on the table information of the table information memory unit 60a.

In this regard, the information regarding the operating area can be determined by selecting from among, for example, the electrical angle θe, the d-axis and q-axis command currents Id* and Iq*, the d-axis and q-axis currents Idr and Iqr, the power supply current Idc, the ω electrical angular velocity e, and the like. It is to be noted that the command torque Trq* of the rotating electrical machine 10 can be also used in place of the d-axis and q-axis command currents Id* and Iq*. In addition, the d-axis and q-axis deviations ΔId and ΔIq can be also used in place of the d-axis and q-axis command currents Id* and Iq* and the d-axis and q-axis currents Idr and Iqr.

According to the present embodiment described above, the operation load of the control device 50 for determining the voltage vectors can be reduced, and the operation speed of the control device 50 can be thus increased.

Other Embodiments

It is to be noted that the embodiments mentioned above may be modified as below and then carried out.

The evaluation function J indicated by the following formula (eq10) may be used in place of the evaluation function J of the foregoing formula (eq3).

[Mathematical Formula 10]

$$J = W_\varphi \sum_{k=1}^{4} |\varphi_* - \varphi_e(n+k)| + W_t \sum_{k=1}^{4} |T_{rq*} - T_e(n+k)| + W_{ic} \cdot I_{cRMS} \quad \text{(eq 10)}$$

Figure 31:
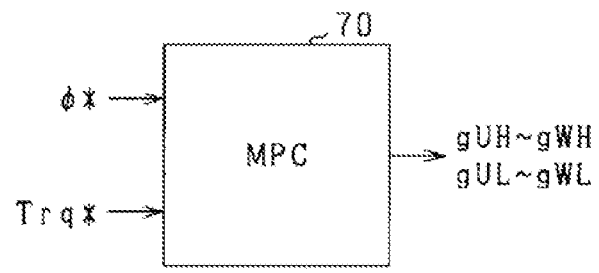
FIG. 31 is a diagram illustrating a model predictive control unit according to another embodiment.

In the foregoing formula (eq10), ϕ* represents a command value of an interlinkage magnetic flux for each phase winding 11U, 11V, or 11W, φe represents a predicted value for the interlinkage magnetic flux, and Wφ represents a weighting factor for a deviation of an interlinkage magnetic flux prediction value with respect to the command value φ* of the interlinkage magnetic flux. Trq* represents a command torque, Te represents a predicated value for the torque, and Wt represents a weighting factor for a deviation of a torque prediction value with respect to the command torque Trq*. The model predictive control unit 70 of the control device 50, shown in FIG. 31, calculates, with the use of the foregoing formula (eq10), an evaluation function J in each of the combinations of voltage vectors in one control cycle. The subsequent processing is the same as in the first embodiment.

Figure 32:
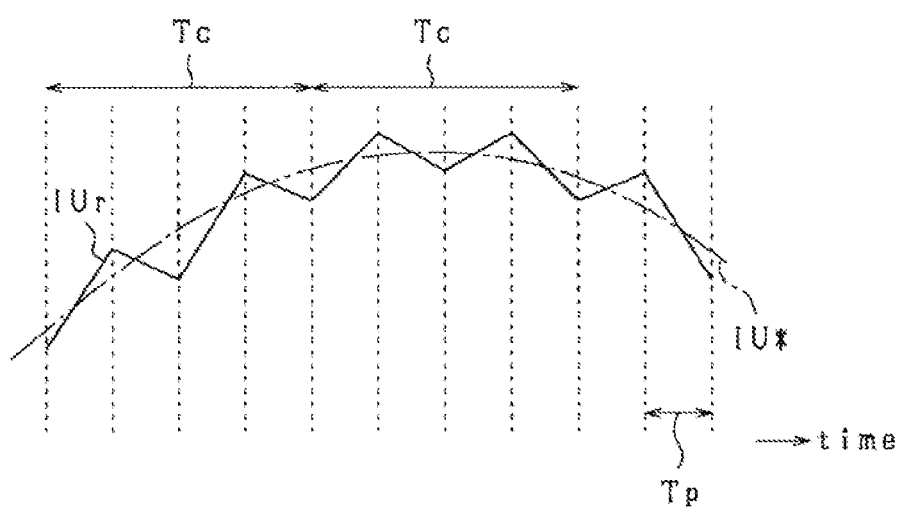
FIG. 32 is a diagram illustrating an aspect of operating an inverter according to another embodiment.

As shown in FIG. 32, the control device 50 may operate the inverter 20 such that the phase current in one control cycle Tc has the same rising period as falling period in each phase. Thus, white noise can be reduced. It is to be noted that FIG. 32 illustrates a U phase current IUr and a U phase command current IU*.

One prediction cycle Tp and one control cycle Tc may be equal in length.

The control units and approaches therefor described in the present disclosure may be achieved by a dedicated computer provided by configuring a processor and a memory programmed so as to execute one or more concrete functions provided by a computer program. Alternatively, the control units and approaches therefor described in the present disclosure may be achieved by a dedicated computer provided by configuring a processor with one or more dedicated hardware logic circuits. Alternatively, the control units and approaches therefor described in the present disclosure may be achieved by one or more dedicated computers configured by combining a processor and a memory programmed so as to execute one or more functions and a processor configured with one or more hardware logic circuits. In addition, the computer program may be stored as an instruction to be executed by a computer in a computer-readable non-transitory tangible recording medium.

More specifically, although the present disclosure is described with reference to the examples, it is understood that the present disclosure is not to be considered limited to the examples, the structures, or the like. The present disclosure encompasses even various modification examples and modifications in the equivalent scope. In addition, various combinations and forms, and furthermore, other combinations and forms including only one element or more or less besides the various combinations and forms are considered to fall within the idea of the present disclosure.

The present disclosure provides a rotating electrical machine control device (50) applied to a system including:

a power conversion circuit (20) electrically connected to a rotating electrical machine (10); and a capacitor (21) electrically connected to an input side of the power conversion circuit, the rotating electrical machine control device including:

a determination unit that determines a switching mode of the power conversion circuit in which a ripple current flowing through the capacitor is reflected, based on an operating area of the rotating electrical machine; and an operation unit that operates the power conversion circuit such that the switching mode of the power conversion circuit is the switching mode determined by the determination unit.

According to the present disclosure, the switching mode of the power conversion circuit in which a ripple current flowing through the capacitor is reflected is determined based on the operating area of the rotating electrical machine. Then, the power conversion circuit is operated such that the switching mode of the power conversion circuit is the determined switching mode. For this reason, the ripple current flowing through the capacitor can be reduced, regardless of the operating area of the rotating electrical machine.

What is claimed is:

1. A rotating electrical machine control device applied to a system including
    a power conversion circuit electrically connected to a rotating electrical machine, the power conversion circuit including at least one pair of upper arm and lower arm switches connected in series; and
    a capacitor electrically connected to an input side of the power conversion circuit, the rotating electrical machine control device comprising:
    a prediction unit that predicts, based on an operating area of the rotating electrical machine, at least a ripple current flowing through the capacitor for each temporarily set switching mode included in a plurality of switching modes, each of the plurality of switching modes defining an on/off operation pattern of the at least one pair of upper arm and lower arm switches;
    a determination unit that:
    performs, based on the operating area of the rotating electrical machine, a comparison between the ripple currents predicted for the respective temporarily set switching modes; and
    selects one of the temporarily set switching modes to according determine the selected one of the temporarily set a switching modes as a control switching mode for control of the inverter in accordance with a result of the comparison; and
    an operation unit that operates the power conversion circuit in accordance with the control switching mode determined by the determination unit,
    wherein a magnitude of the ripple current for each of the temporarily set switching modes is defined as a difference between a value of the capacitor current in a first period with at least one active voltage vector determined by the corresponding one of the temporarily set switching modes and a value of the capacitor current in a second period with at least one reactive voltage vector determined by the corresponding one of the temporarily set switching modes.

2. The rotating electrical machine control device according to claim 1, wherein the prediction unit predicts, for each of the temporarily set switching modes, a controlled quantity for the rotating electrical machine and a capacitor current flowing through the capacitor as a parameter of the ripple current, and
    the determination unit calculates, for each of the temporarily set switching modes, an evaluation function, the evaluation function including (i) deviation between the predicted controlled quantity and a command value thereof and (ii) the predicted capacitor current, and performs, as the comparison, a function comparison between the evaluation functions calculated for the respective switching modes, and selects, based on a result of the function comparison, one of the temporarily set switching modes as the control switching mode employed in a next control cycle.

3. The rotating electrical machine control device according to claim 2, wherein the determination unit selects one of the temporarily set switching modes as the control switching mode employed in the next control cycle when an effective value of the predicted capacitor current for the one of the switching modes is a minimum value in all effective values of all the predicted capacitor currents.

4. The rotating electrical machine control device according to claim 2, wherein the determination unit selects one of the switching modes as the control switching mode employed in the next control cycle, with a condition imposed for the predicted capacitor current for each of the temporarily set switching modes so as not to exceed an upper acceptance value of the current.

5. The rotating electrical machine control device according to claim 4, wherein the determination unit makes the upper acceptance value variable, based on the operating area.

6. The rotating electrical machine control device according to claim 2, wherein the operation unit calculates, based on the determined control switching mode, a command voltage applied to the rotating electrical machine in a fixed coordinate system, and operates the power conversion circuit in accordance with PWM processing based on comparison in magnitude between the command voltage calculated and a carrier signal.

7. The rotating electrical machine control device according to claim 2, wherein the controlled quantity is a current flowing through the rotating electrical machine in a rotating coordinate system.

8. The rotating electrical machine control device according to claim 2, wherein the controlled quantity is a torque of the rotating electrical machine and an interlinkage magnetic flux of a winding constituting the rotating electrical machine.

9. The rotating electrical machine control device according to claim 2, further comprising a feedback operation unit that calculates a command voltage applied to the rotating electrical machine in a rotating coordinate system as an operational quantity for feedback control of the controlled quantity to a command value thereof, wherein
the prediction unit determines, based on the command voltage calculated, the temporarily set switching modes.

10. The rotating electrical machine control device according to claim 2, wherein the prediction unit uses, as the temporarily set switching modes, switching modes respectively corresponding to six active voltage vectors and two reactive voltage vectors applied to the rotating electrical machine.

11. The rotating electrical machine control device according to claim 2, wherein the prediction unit uses, as the temporarily set switching modes, switching modes corresponding to, among six active voltage vectors and two reactive voltage vectors applied to the rotating electrical machine, only the active voltage vectors.

12. The rotating electrical machine control device according to claim 11, wherein the prediction unit comprises:
a first processing unit that selects two active voltage vectors that sandwich a command voltage vector applied to the rotating electrical machine and have a phase difference of 60 degrees from each other; and
a second processing unit that selects, of two active voltage vectors that sandwich the command voltage vector and have a phase difference of 120 degrees from each other, the active voltage vector that is different from the active voltage vectors selected by the first processing unit, and
switching modes corresponding to only the three active voltage vectors selected respectively by the first processing unit and the second processing unit, among the six active voltage vectors and two reactive voltage vectors applied to the rotating electrical machine, are used as the temporarily set switching modes.

13. The rotating electrical machine control device according to claim 2, wherein the prediction unit selects two active voltage vectors that sandwich a command voltage vector applied to the rotating electrical machine and have a phase difference of 120 degrees from each other, and uses, as the temporarily set switching modes, switching modes corresponding to, among six active voltage vectors and two reactive voltage vectors applied to the rotating electrical machine, only the two active voltage vectors selected and at least one of the reactive voltage vectors.

14. The rotating electrical machine control device according to claim 2, wherein the prediction unit comprises:
a first processing unit that selects two active voltage vectors that sandwich a command voltage vector applied to the rotating electrical machine and have a phase difference of 60 degrees from each other; and
a second processing unit that selects, of two active voltage vectors that sandwich the command voltage vector and have a phase difference of 120 degrees from each other, the active voltage vector that is different from the active voltage vectors selected by the first processing unit,
in a case where the voltage applied to the rotating electrical machine has a modulation factor less than or equal to a predetermined modulation factor, switching modes corresponding to only the three active voltage vectors selected respectively by the first processing unit and the second processing unit, among six active voltage vectors and two reactive voltage vectors applied to the rotating electrical machine, are used as the temporarily set switching modes, and
in a case where the modulation factor exceeds the predetermined modulation factor, switching modes corresponding to only the two active voltage vectors selected by the second processing unit and the two reactive voltage vectors, among the six active voltage vectors and two reactive voltage vectors applied to the rotating electrical machine, are used as the temporarily set switching modes.

15. The rotating electrical machine control device according to claim 2, wherein the prediction unit temporarily sets, as the temporarily set switching modes, multiple switching modes in each of prediction cycles obtained by dividing one control cycle into multiple cycles, and predicts the controlled quantity and the current flowing through the capacitor for each of combinations of the switching modes set in the respective prediction cycles.

16. The rotating electrical machine control device according to claim 2, wherein the prediction unit predicts, in a case where N is an integer of 2 or more, the controlled quantity and the current flowing through the capacitor in a period for one or more cycles of an N-th order harmonic component of the controlled quantity.

17. The rotating electrical machine control device according to claim 1, wherein:
the prediction unit predicts a controlled quantity for the rotating electrical machine and the capacitor current in a case where the plurality of switching modes for the power conversion circuit are each temporarily set, and
the determination unit sets a predetermined range ($\Delta Ithq$) with a command value of the controlled quantity as a median value, and determines, as the control switching mode employed next, a switching mode corresponding to the controlled quantity at a latest timing at which the predicted current flowing through the capacitor does not exceed an upper acceptance value of the current and passes through an upper limit or a lower limit of the predetermined range, of the controlled quantity predicted in each of the multiple switching modes temporarily set, and the operation unit operates the power conversion circuit so as to switch, at the latest timing, the control switching mode of the power conversion circuit to the switching mode determined by the determination unit.

18. The rotating electrical machine control device according to claim 1, further comprising a memory unit that stores information regarding each of the plurality of switching modes, the information regarding each of the plurality of switching modes being associated with information regarding the operating area and reflecting a value of the ripple current for the corresponding one of the plurality of switching modes, wherein the determination unit selects one of the temporarily set switching modes to accordingly determine the selected one of the temporarily set switching modes as the control switching mode for control of the inverter in accordance with the result of the comparison and the information stored in the memory unit.

19. The rotating electrical machine control device according to claim 1, wherein the operation unit operates the power conversion circuit such that a phase current flowing through the rotating electrical machine has a rising period and a falling period equal to each other.

20. The rotating electrical machine control device according to claim 1, wherein the operation unit operates the power conversion circuit such that a switching frequency in each control cycle is equal for switches constituting the power conversion circuit.

21. The rotating electrical machine control device according to claim 1, wherein the operation unit operates the power conversion circuit such that among the switches constituting the power conversion circuit in phases, the switches in multiple phases are not simultaneously switched.

22. The rotating electrical machine control device according to claim 1, wherein the operation unit operates the power conversion circuit while permitting, among the switches constituting the power conversion circuit in phases, the switches in multiple phases to be simultaneously switched.

23. The rotating electrical machine control device according to claim 1, wherein the determination unit selects one of the temporarily set switching modes such that the selected one of the temporarily set switching modes has a smallest value of the ripple current in all values of the ripple current in all the temporarily set switching modes.

\* \* \* \* \*